US012353527B2

(12) United States Patent
Waterman

(10) Patent No.: US 12,353,527 B2
(45) Date of Patent: Jul. 8, 2025

(54) CREATING AND USING DEVICE ORIENTATION FINGERPRINTS

(71) Applicant: AT&T Intellectual Property I, L.P., Atlanta, GA (US)

(72) Inventor: Alexander Waterman, Palm Harbor, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 406 days.

(21) Appl. No.: 17/565,527

(22) Filed: Dec. 30, 2021

(65) Prior Publication Data

US 2023/0214463 A1 Jul. 6, 2023

(51) Int. Cl.
| | |
|---|---|
| G06F 21/31 | (2013.01) |
| G06F 21/32 | (2013.01) |
| G06F 21/44 | (2013.01) |
| G06N 20/00 | (2019.01) |
| G06V 40/12 | (2022.01) |
| G06V 40/50 | (2022.01) |
| H04M 1/72463 | (2021.01) |
| H04W 4/02 | (2018.01) |

(52) U.S. Cl.
CPC ............ *G06F 21/316* (2013.01); *G06F 21/32* (2013.01); *G06F 21/44* (2013.01); *G06N 20/00* (2019.01); *G06V 40/1365* (2022.01); *G06V 40/50* (2022.01); *H04M 1/72463* (2021.01); *H04W 4/026* (2013.01); *G06F 2221/2103* (2013.01); *G06F 2221/2117* (2013.01)

(58) Field of Classification Search
CPC ...... H04W 4/026; G06F 21/32; G06F 21/316; G06V 40/50; G06V 40/1365; H04M 1/72463; G06N 20/00
See application file for complete search history.

(56) References Cited

U.S. PATENT DOCUMENTS

| | | | | |
|---|---|---|---|---|
| 8,660,532 B2* | 2/2014 | Conti | ................... | H04W 12/06 |
| | | | | 455/410 |
| 9,740,839 B2* | 8/2017 | Zafiris | ................... | G06F 1/1694 |

(Continued)

OTHER PUBLICATIONS

"Min et al., Effective Fingerprint Classification by Localized Models of support Vector Machine, 2005, Department of Computer Science, Yonsei University, Biometrics Engineering Research Center, p. 287-293" (Year: 2005).*

(Continued)

*Primary Examiner* — Daniel B Potratz
*Assistant Examiner* — Faghia Telat Rana
(74) *Attorney, Agent, or Firm* — Hartman & Citrin LLC

(57) ABSTRACT

Creating and using device orientation fingerprints can include detecting a request to create an orientation fingerprint for a user device, where the orientation fingerprint defines an orientation of the user device and includes a machine learning model that models, for the user device and a known user of the user device, multiple orientations of the device for multiple activities. Operational data that includes orientation data, identity data, and activity data can be obtained. The operational data can be provided to machine learning to output the orientation fingerprint and the orientation fingerprint can be stored with data that associates the orientation fingerprint with the known user.

20 Claims, 15 Drawing Sheets

(56) References Cited

U.S. PATENT DOCUMENTS

| | | | | |
|---|---|---|---|---|
| 2015/0355822 | A1* | 12/2015 | Cochran | G06T 11/60 |
| | | | | 345/676 |
| 2016/0300054 | A1* | 10/2016 | Turgeman | G06F 21/36 |
| 2019/0349534 | A1* | 11/2019 | Mukundan | G06V 10/242 |
| 2019/0379657 | A1* | 12/2019 | Gosalia | H04W 12/06 |
| 2020/0356754 | A1* | 11/2020 | Chen | G06V 40/1365 |

OTHER PUBLICATIONS

Talbot, David, "Now Your Phone's Tilt Sensor Can Identify You," MIT Technology Review, May 1, 2014, retrieved at https://www.technologyreview.com/2014/05/01/172972/now-your-phones-tilt-sensor-can-identify-you/.

Dealna, "How the Accelerometer in Your Phone Could Help Identify You," retrieved at https://dealna.com/en/Article/Post/313/How-the-Accelerometer-in-Your-Phone-Could-Help-Identify-You on Nov. 30, 2021.

Townsend, Kevin, "Attackers Could Use Mobile Device Sensors to Generate Unique Device Fingerprint: Research," SecurityWeek, May 22, 2019, retrieved at https://www.securityweek.com/attackers-could-use-mobile-device-sensors-generate-unique-device-fingerprint-research.

* cited by examiner

CREATING AND USING DEVICE ORIENTATION FINGERPRINTS

BACKGROUND

In cybersecurity, threat detection platforms can perform user behavioral analytics ("UBA") as part of identifying and neutralizing malicious activity. In some instances, the platforms can monitor user behavior to determine a baseline for a user or device and can analyze activity of the user or device to identify anomalous activity (e.g., activity that deviates from the baseline). Such anomalous behavior can be deemed malicious. In some instances, the platforms can monitor user authentication activity, privilege levels, and other metrics, and then can correlate this information over time to build a notion of "normal activity" for a user. Deviations from this baseline normalcy, which security researchers may identify as malicious, can then be provided to security analysts for further investigation.

UBA systems can use advanced analytics and machine learning ("ML") to build a baseline model of device usage and can use this baseline model to identify usage that deviates from the expected baseline. For example, such models can be used to identify when a user, or the device the user is using, has been compromised and the actions being taken are not those of the user, but rather those of a bad actor that is masquerading as the user. Identifying this accurately with a low false positive rate is an important part of providing high-value threat detection solutions.

SUMMARY

The present disclosure is directed to creating and using device orientation fingerprints. In practice, a user device can operate in communication with an orientation fingerprint service, for example via a network. The user device can execute an orientation tracking application, which can be configured to monitor orientation of the user device as well as identity of users using the user device and activities being performed using the user device. If a user opts in to using the orientation fingerprint service, the orientation tracking application can either perform a training program to create an orientation fingerprint, or can inform the orientation fingerprint service to create the orientation fingerprint over time using observed behavior of the user device (by the user). The orientation tracking application can be configured to periodically collect orientation, identity, activity, and/or other data, and to submit these data as operational data to the orientation fingerprint service.

The orientation fingerprint service can be configured to analyze the operational data and/or to perform machine learning on the operational data to develop one or more models of orientation ("orientation models") for the user. These orientation models, referred to herein as orientation fingerprints, can be developed for a user over one or more devices and can define how a device such as the user device is oriented in the midst of various activities. The orientation fingerprint service can store the orientation fingerprints locally or remotely at a real or virtualized data storage resource.

The orientation fingerprint service can operate to confirm that the user is using the user device at almost any time. In some embodiments, the orientation fingerprint service operates to periodically determine if the user is using the user device without any specific request or service call. In some other embodiments, a UBA module or other security functionality may flag behavior of the user device as being anomalous (relative to some baseline or expected behavior) and the functionality of the orientation fingerprint service can be invoked to provide another data point to be used in determining if the known user is using the user device. In yet other embodiments, other network devices and/or third parties such as the resource can request verification of the user's identity, for example by sending an identity verification request to the orientation fingerprint service and obtaining, from the orientation fingerprint service, an identity verification decision. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting a request to create an orientation fingerprint for a user device. The orientation fingerprint can define an orientation, in a three-dimensional space, of the user device. The orientation fingerprint can include a machine learning model that models, for the user device and a known user of the user device, two or more orientations for two or more activities. The operations further can include obtaining, from the user device, operational data that can include orientation data that can define the orientation, identity data that identifies the known user, and activity data that can define one activity of the two or more activities that is being engaged in by the user device, providing the operational data to machine learning to output the orientation fingerprint, and storing the orientation fingerprint with data that associates the orientation fingerprint with the known user.

In some embodiments, the orientation data can include a first data point that defines a roll of the user device, a second data point that can define a pitch of the user device, and a third data point that can define a yaw of the user device. In some embodiments, the orientation data can be obtained from an orientation sensor of the user device. The orientation sensor can include at least one of a gyroscope or a magnetometer.

In some embodiments, the operations further can include determining that a current user of the user device is to be verified; obtaining the orientation fingerprint associated with the known user; obtaining, from the user device, another release of the operational data including current orientation data that can define a current orientation of the user device and a current activity being engaged in by the user device; determining, based on the orientation fingerprint and the other release of the operational data, if the known user is currently using the user device; if a determination is made that the known user is currently using the user device, taking action to allow the current activity; and if a determination is made that the known user is not currently using the user device, taking action to block the current activity.

In some embodiments, determining that the current user of the user device is to be verified can include receiving, from a user behavioral analytics module, a service call requesting that the current user of the user device be verified. In some embodiments, the user behavioral analytics module can send the service call in response to detecting an anomaly in behavior of the user device. In some embodiments, the user device captures the operational data during a training program executed by the user device.

According to another aspect of the concepts and technologies disclosed herein, a method is disclosed. The method can include detecting, by a computer including a processor, a request to create an orientation fingerprint for a user device. The orientation fingerprint can define an orientation, in a three-dimensional space, of the user device, and the orientation fingerprint can include a machine learning model that models, for the user device and a known user of the user device, two or more orientations for two or more activities. The method further can include obtaining, from the user device and by the processor, operational data that can include orientation data that can define the orientation, identity data that identifies the known user, and activity data that can define one activity of the two or more activities that is being engaged in by the user device; providing, by the processor, the operational data to machine learning to output the orientation fingerprint; and storing, by the processor, the orientation fingerprint with data that associates the orientation fingerprint with the known user.

In some embodiments, the orientation data can be obtained from an orientation sensor of the user device. The orientation sensor can include at least one of a gyroscope; or a magnetometer. In some embodiments, the method further can include determining that a current user of the user device is to be verified; obtaining the orientation fingerprint associated with the known user; obtaining, from the user device, another release of the operational data including current orientation data that can define a current orientation of the user device and a current activity being engaged in by the user device; determining, based on the orientation fingerprint and the other release of the operational data, if the known user is currently using the user device; if a determination is made that the known user is currently using the user device, taking action to allow the current activity; and if a determination is made that the known user is not currently using the user device, taking action to block the current activity.

In some embodiments, determining that the current user of the user device is to be verified can include receiving, from a user behavioral analytics module, a service call requesting that the current user of the user device be verified. In some embodiments, the user behavioral analytics module can send the service call in response to detecting an anomaly in behavior of the user device. In some embodiments, the user device captures the operational data during a training program executed by the user device.

According to yet another aspect of the concepts and technologies disclosed herein, a computer storage medium is disclosed. The computer storage medium can store computer-executable instructions that, when executed by a processor, cause the processor to perform operations. The operations can include detecting a request to create an orientation fingerprint for a user device. The orientation fingerprint can define an orientation, in a three-dimensional space, of the user device. The orientation fingerprint can include a machine learning model that models, for the user device and a known user of the user device, two or more orientations for two or more activities. The operations further can include obtaining, from the user device, operational data that can include orientation data that can define the orientation, identity data that identifies the known user, and activity data that can define one activity of the two or more activities that is being engaged in by the user device, providing the operational data to machine learning to output the orientation fingerprint, and storing the orientation fingerprint with data that associates the orientation fingerprint with the known user.

In some embodiments, the orientation data can include a first data point that defines a roll of the user device, a second data point that can define a pitch of the user device, and a third data point that can define a yaw of the user device. In some embodiments, the orientation data can be obtained from an orientation sensor of the user device. The orientation sensor can include at least one of a gyroscope or a magnetometer.

In some embodiments, the operations further can include determining that a current user of the user device is to be verified; obtaining the orientation fingerprint associated with the known user; obtaining, from the user device, another release of the operational data including current orientation data that can define a current orientation of the user device and a current activity being engaged in by the user device; determining, based on the orientation fingerprint and the other release of the operational data, if the known user is currently using the user device; if a determination is made that the known user is currently using the user device, taking action to allow the current activity; and if a determination is made that the known user is not currently using the user device, taking action to block the current activity.

In some embodiments, determining that the current user of the user device is to be verified can include receiving, from a user behavioral analytics module, a service call requesting that the current user of the user device be verified. In some embodiments, the user behavioral analytics module can send the service call in response to detecting an anomaly in behavior of the user device. In some embodiments, the user device captures the operational data during a training program executed by the user device.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
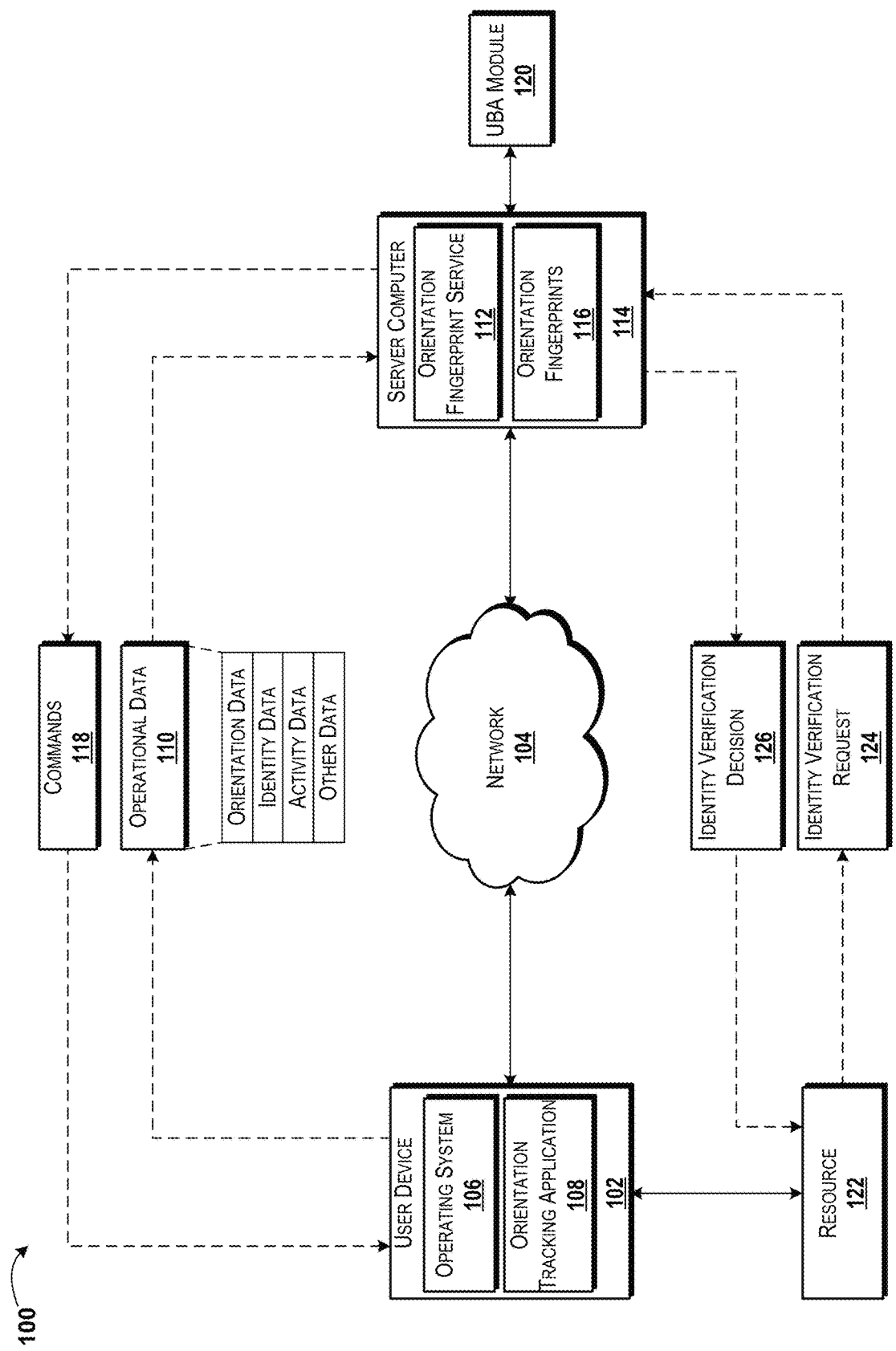
FIG. 1 is a system diagram illustrating an illustrative operating environment for various embodiments of the concepts and technologies described herein.

The following detailed description is directed to creating and using device orientation fingerprints. In practice, a user device can operate in communication with an orientation fingerprint service, for example via a network. The user device can execute an orientation tracking application, which can be configured to monitor orientation of the user device as well as identity of users using the user device and activities being performed using the user device. If a user opts in to using the orientation fingerprint service, the orientation tracking application can either perform a training program to create an orientation fingerprint, or inform the orientation fingerprint service to create the orientation fingerprint over time using observed behavior of the user device. The orientation tracking application can be configured to periodically collect orientation, identity, activity, and/or other data and submit these data as operational data to the orientation fingerprint service.

The orientation fingerprint service can be configured to analyze the operational data and/or to perform machine learning on the operational data to develop one or more models of orientation models for the user. These orientation models, referred to herein as orientation fingerprints, can be developed for a user over one or more devices and can define how a device such as the user device is oriented in the midst of various activities. The orientation fingerprint service can store the orientation fingerprints locally or remotely at a real or virtualized data storage resource.

The orientation fingerprint service can operate to confirm that the user is using the user device at almost any time. In some embodiments, the orientation fingerprint service operates to periodically determine if the user is using the user device without any specific request or service call. In some other embodiments, a UBA module or other security functionality may flag behavior of the user device as being anomalous and the functionality of the orientation fingerprint service can be invoked to determine if the known user is using the user device. In yet other embodiments, other network devices and/or third parties such as the resource can request verification of the user's identity, for example by sending an identity verification request to the orientation fingerprint service and obtaining, from the orientation fingerprint service, an identity verification decision. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating and using device orientation fingerprints will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more mobile telephones, smartphones, tablet computers, smart watches, and/or other wearable and/or portable computing systems, and the like. For purposes of describing the concepts and technologies disclosed herein, the user device 102 is described herein as a mobile phone or smartphone. It should be understood that this embodiment is illustrative, and should not be construed as being limiting in any way.

The user device 102 can execute an operating system 106 and one or more application programs such as, for example, an orientation tracking application 108. The operating system 106 can include a computer program that can control the operation of the user device 102. The orientation tracking application 108 can include an executable program that can be configured to execute on top of the operating system 106 to provide various functions as illustrated and described herein for tracking and using orientation of the user device 102.

In particular, the orientation tracking application 108 can be configured to track orientation of the user device 102 at any, at some, and/or at all times. The orientation of the user device 102 as illustrated and described herein can include the orientation, in a three-dimensional space, of the user device 102. As used herein, "orientation" does not include geographic location of the user device 102. Rather, "orientation" as used herein refers to the orientation of the user device 102 with respect to a fixed or dynamic reference (e.g., a coordinate system, a set of axes, a user, etc.). Thus, in various embodiments of the concepts and technologies disclosed herein, the "orientation" of the user device 102 can be described in terms of roll, pitch, and yaw; Euler angles; Tait-Bryan angles; and/or other measures of angles. According to various embodiments of the concepts and technologies disclosed herein, orientation can be measured along or with reference to a three-axis system where the axes can be offset by exactly ninety degrees in at least one plane (e.g., the x-y-z coordinate system, or the like). Because other methods and/or systems exist for describing orientation of an object in a three-dimensional space, it should be understood that these example orientation descriptors are illustrative, and therefore should not be construed as being limiting in any way.

According to various embodiments of the concepts and technologies disclosed herein, the orientation tracking application 108 can be configured to track orientation of the user device 102, to determine an identity of a user using the user device 102 at a particular time, to determine an activity being performed with the user device 102 at a particular time, and/or to capture other information (e.g., environmental information, network information, and/or other types of information). The orientation tracking application 108 also can be configured to package this and/or other information as operational data 110. According to various embodiments of the concepts and technologies disclosed herein, the operational data 110 can be used by the user device 102 and/or an orientation fingerprint service 112 executed by a server computer 114 to create one or more orientation fingerprints 116.

In some embodiments, the operational data 110 can be generated by the user device 102 using one or more orientation sensors of the user device 102 such as, for example, a magnetometer, a gyroscope, or other orientation sensors. It also can be appreciated that in some embodiments the orientation of the user device 102 can be defined in global terms (e.g., by using the magnetometer, the orientation can be defined relative to an established direction such as north, etc.) or in relative terms (e.g., facing the user's face, turned away from the user's face, etc.). Because the operational data 110 can be defined in additional and/or alternative manners and/or with reference to other fixed or dynamic references, it should be understood that these examples are illustrative, and therefore should not be construed as being limiting in any way.

According to various embodiments of the concepts and technologies disclosed herein, the operational data 110 can include orientation data, identity data, activity data, and/or other data. The orientation data can include data and/or a data set (e.g., a matrix) that can define the orientation of the user device 102 at particular times such as, for example, when the user device 102 is being used for a particular activity. It can be appreciated that the orientation of the user device 102 may change over time during a particular activity, so the orientation data can include a string or collection of values (e.g., a stream of matrices that define three dimensional orientations in a format such as, for example, in terms of roll, pitch, and yaw, etc.). As such, over time the orientation data may include any number of definitions of orientation for a particular type of activity, and the orientation can be modeled using this information as will be explained in more detail hereinbelow. According to various embodiments of the concepts and technologies disclosed herein, the operational data 110 can be obtained at regular or irregular intervals during operation of the user device 102 (e.g., every one second, every five seconds, every ten seconds, every minute, etc.). Because the operational data 110 can be obtained at other times, it should be understood that these examples are illustrative, and therefore should not be construed as being limiting in any way.

In some other embodiments, the operational data 110 can include a data set that can represent orientation of the user device 102 at more than one time (e.g., obtained at regular or irregular intervals, etc.). In yet other embodiments, the orientation data and/or the operational data 110 can include data points and/or sets of data points captured when specific trigger events are detected, etc. Because the operational data 110 can be obtained in additional or alternative manners, and because the operational data 110 can be obtained at additional and/or alternative times, it should be understood that the above examples are illustrative, and therefore should not be construed as being limiting in any way.

The identity data can define a user or other entity associated with the user device 102 when the operational data 110 is captured. The user or other entity can be identified in a number of manners. In some embodiments, information such as, for example, a login/password; challenge question; biometric information; or other authentication information can be used by the user device 102 and/or the orientation tracking application 108 to identify the user or other entity that is using the user device 102 at a particular time. The identity of the user can be determined and indicated in any desirable manner including, for example, assigning a name, a string, an object, or even a globally unique identifier ("GUID") to the user or identity and storing operational data 110 as being associated with that identity. Because identifying a user or other entity and storing data as being associated with that identity is generally understood, various approaches for identifying the user and/or storing data as being associated with that user are not illustrated and described in additional detail here.

The activity data can describe or define an activity with which the identity data and orientation data is associated. For example, a particular orientation or set of orientation data may be defined for a particular activity such as, for example, browsing the web; sending a text; walking around; making a phone call; checking the weather; etc. For the model of orientation to be useful in the future, some embodiments of the concepts and technologies disclosed herein include generating and/or capturing information that describes or identifies an activity associated with the orientation data and storing that activity information with the operational data 110. In some embodiments, there can be specific activities that can be defined for the operational data 110, and in other embodiments the activities can be customized by the orientation fingerprint services 112.

In some contemplated embodiments, the activities defined for purposes of creating the orientation fingerprints 116, and as defined by the activity data, can include a number of activities that can be defined for a device, for a class of devices, for all devices, or the like. In the case of the example user device 102 shown in FIG. 1, the activities can include activities associated with a smart phone such as, for example, making a traditional (i.e., holding the phone to one's ear) phone call; making a phone call using the speaker phone; making a phone call using a headset or earbuds; engaging in a text or message exchange; composing an email; browsing the Internet; using a native mobile application ("mobile app"); taking a photo; taking a video; taking a selfie; walking around; conducting a video call; driving around; watching media (e.g., a movie, TV show, or the like); and/or other activities. Thus, the activity data can define an activity being completed using the user device 102 and thereby can associate, with a particular instance of orientation data and identity data, an activity. Because many other activities are possible and are contemplated, it should be understood that these examples are illustrative, and therefore should not be construed as being limiting in any way.

The other data can include various types of information that may be used to further refine and define the orientation fingerprints 116. For example, the other data can identify a device manufacturer and model number. Such information may be useful if a particular user has multiple devices that he or she holds and/or uses in different manners. Of course, the device manufacturer and/or model number may be useful for other reasons such as interpreting orientation information, etc. Thus, an orientation fingerprint 116 can be defined for a user across one or more devices such as, for example, the user device 102 and another device (e.g., a tablet computer, a smartphone, a mobile phone, a smart watch, etc.). The other data also can capture other information associated with a particular instance of operational data 110 such as, for example, environmental data, location information, and the like. It can be appreciated that a user may use his or her device differently in certain environments (e.g., a user may hold a device in one manner when in a crowded mall; and a second manner when in a private home, etc.). Because the other data can include any other data illustrated and described herein as being included in the operational data 110, it should be understood that these examples are illustrative, and therefore should not be construed as being limiting in any way.

As used herein, an orientation fingerprint 116 can include, in some embodiments, a machine learning model of orientation of the user device 102 (or other device associated with a user) at various times, during various activities, and the like. In some embodiments, the orientation fingerprint 116 can include a set of algorithms that collectively can model the orientation of the user device 102 when used by a particular user at a particular time and/or during a particular type of activity (e.g., speaking on the phone, sending a text message, browsing the Internet, watching media, conducting a video call, conducting or joining a video conference, walking around, etc.). The orientation fingerprint 116 also can include a set of data such as, for example, a list of activities and an associated model of orientation for each of those activities; identity and/or user information; combinations thereof; or the like. As such, it can be appreciated that the orientation fingerprint 116 can be used to determine and/or predict orientation of the user device 102 when a particular activity is occurring at the user device 102. Because a network operator or other entity may know what activity is ongoing at the user device 102, it can be appreciated that the orientation fingerprint 116 can be used by a network operator to confirm that the user device 102 involved in a particular activity is currently being controlled and/or held by a user known to be associated with that user device 102. It should be understood that this example is illustrative, and therefore should not be construed as being limiting in any way.

According to various embodiments of the concepts and technologies disclosed herein, the orientation fingerprint service 112 can be configured to obtain the operational data 110 at various times, and to generate or update an orientation fingerprint 116 based on the operational data 110. As will be explained in more detail below, the operational data 110 also can be obtained at other times and compared to an orientation fingerprint 116 to determine if the user associated with the orientation fingerprint 116 is using the device (e.g., the user device 102) at a particular time. These and other aspects of creating and using the orientation fingerprints 116 will be illustrated and described in more detail below after introducing additional components of the operating environment 100.

In some embodiments, the orientation fingerprint service 112 can be configured to issue one or more commands 118 to devices such as the user device 102. The commands 118 issued by the orientation fingerprint service 112 can include instructions for the user device 102 to provide the operational data 110 to the orientation fingerprint service 112. Thus, it can be appreciated that the orientation fingerprint service 112 can issue the commands 118 to "pull" the operational data 110 from the user device 102, in some embodiments. In some other embodiments, the commands 118 can instruct the user device 102 to provide the operational data 110 at specified time intervals (e.g., every second, every ten seconds, every minute, every ten minutes, etc.); when trigger events occur (e.g., when an activity changes, when the user device 102 is powered on or powered off or put into standby mode, etc.); and/or at other times.

As such, it can be appreciated that the commands 118 can request the operational data 110 at a certain time or instruct the user device 102 to provide the operational data 110. In yet other embodiments, the commands 118 can be provided to cause the user device 102 to perform an opt-in/opt-out process at the user device 102. Thus, the command 118 can instruct the user device 102 to determine if a user wishes to use the orientation fingerprint service 112 or not. An example opt-in/opt-out user interface is illustrated and described below with reference to FIG. 5A. Because the commands 118 can be used to instruct the user device 102 to take other actions with respect to creating or using orientation fingerprints 116 (e.g., instructing the user device 102 to authenticate a user; to activate or de-activate the orientation tracking application 108; or the like), it should be understood that these examples are illustrative, and therefore should not be construed as being limiting in any way.

Although not illustrated in FIG. 1, the orientation fingerprints 116 can be stored, in some embodiments, in a database or other data structure that can be accessed by the server computer 114 and/or other devices. The functionality of the database or other data structure can be provided by one or more real or virtual databases, server computers, desktop computers, mobile telephones, laptop computers, other computing systems, and the like. Because other real and/or virtualized entities can store the orientation fingerprints 116, it should be understood that these examples are illustrative, and therefore should not be construed as being limiting in any way.

According to some embodiments of the concepts and technologies disclosed herein, the orientation fingerprint service 112 can be configured to obtain multiple releases of the operational data 110 after the orientation fingerprint 116 is created. The operational data 110 can be obtained to determine if a recognized user is using the user device 102; to update the orientation fingerprint 116; and/or for other purposes. In some embodiments, the orientation fingerprint service 112 is configured to run continuously and to obtain the operational data 110 continuously (e.g., every second, every ten seconds, when an activity changes, and/or at other events or intervals) to verify that the user is using the user device 102.

In some other embodiments, the orientation fingerprint service 112 is configured to run in association with other network security functionality. For example, the orientation fingerprint service 112 can be configured to operate as a part of and/or in association with a UBA module 120. In some embodiments, the orientation fingerprint service 112 can be a component of the UBA module 120, though this is not the case in the illustrated embodiment. As such, it should be understood that this example embodiment is illustrative, and therefore should not be construed as being limiting in any way.

The UBA module 120 can be configured, in some embodiments, to monitor activity of the user device 102 (although not shown in FIG. 1, it can be appreciated that the UBA module 120 can receive reports from a network monitor or other functionality to monitor behavior of the user device 102). The UBA module 120 can analyze the activity of the user device 102 (e.g., links visited, time spent at specific sites, emails sent, calls made, etc.) and identify, based on some baseline of normal behavior for the user device 102, anomalous behavior.

Such "anomalous behavior" can include activity that is inconsistent with the model of normal behavior as developed by the UBA module 120 for that user device 102. Thus, it can be appreciated that the functionality of the orientation fingerprint service 112 can be invoked, for example, to determine if the recognized user is using the user device 102 when some behavioral anomaly is detected. Although not separately shown in FIG. 1, it should be understood that the UBA module 120 can issue a service call or request to the orientation fingerprint service 112 to request that the orientation fingerprint service 112 analyze orientation of the user device 102 to determine if the known user is currently using the user device 102. Thus, in some embodiments of the concepts and technologies disclosed herein, the orientation fingerprint service 112 can function as an additional layer of anomaly detection in association with the UBA module 120, and/or as a way to clear behavior seen as anomalous by the UBA module 120 without the user's current use being disturbed. It should be understood that this example is illustrative, and therefore should not be construed as being limiting in any way.

In yet other embodiments, the functionality of the orientation fingerprint service 112 can be requested by other network devices and/or by third parties. In the example embodiment shown in FIG. 1, for example, the user device 102 can attempt to access a resource 122 such as a website, an application, a network resource, etc. The resource 122 can request authentication of the user device 102 for any reason including, for example, to enable access to the resource 122, to provide user-specific information, combinations thereof, or the like. The resource 122 can be configured to generate an identity verification request 124 and to send the identity verification request 124 to the orientation fingerprint service 112. The orientation fingerprint service 112 can obtain operational data 110, if not already obtained, from the user device 102 (e.g., by sending a command 118 to the user device 102), and compare the operational data 110 to the orientation fingerprint 116 stored for the user associated with the user device 102.

If the orientation of the user device 102 matches what is expected for the user in the activity currently occurring, the orientation fingerprint service 112 can allow the activity or trigger other entities to allow the activity. If the orientation of the user device 102 does not match what is expected for the user in the activity currently occurring, the orientation fingerprint service 112 can take steps to block the activity or to trigger other entities to block the activity. In some embodiments, the orientation fingerprint service 112 can generate an identity verification decision 126 that can indicate that the user device 102 is being controlled by the user (and that the access to the resource 122 or other activity should be allowed), or that the user device 102 is not necessarily being controlled by the user (and that the access to the resource 122 or other activity should be blocked). It should be understood that this example is illustrative, and therefore should not be construed as being limiting in any way.

In practice, a user device 102 can operate in communication with a network 104. The user device 102 can execute an orientation tracking application 108, which can be configured to monitor orientation of the user device 102 as well as identity of users using the user device 102 and activities being performed using the user device 102. If a user opts in to using the orientation fingerprint service 112, the orientation tracking application 108 can either perform a training program to create an orientation fingerprint 116, or inform the orientation fingerprint service 112 to create the orientation fingerprint 116 over time using observed behavior of the user device 102. The orientation tracking application 108 can be configured to periodically collect orientation, identity, activity, and/or other data and submit these data as operational data 110 to the orientation fingerprint service 112.

The orientation fingerprint service 112 can be configured to analyze the operational data 110 and/or to perform machine learning on the operational data 110 to develop one or more models of orientation models for the user. These orientation models, referred to herein as orientation fingerprints 116, can be developed for a user over one or more devices and can define how a device such as the user device 102 is oriented in the midst of various activities. The orientation fingerprint service 112 can store the orientation fingerprints 116 locally or remotely at a real or virtualized data storage resource.

The orientation fingerprint service 112 can operate to confirm that the user is using the user device 102 at almost any time. In some embodiments, the orientation fingerprint service 112 operates to periodically determine if the user is using the user device 102 without any specific request or service call. In some other embodiments, a UBA module 120 or other security functionality may flag behavior of the user device 102 as being anomalous and the functionality of the orientation fingerprint service 112 can be invoked to determine if the known user is using the user device 102. In yet other embodiments, other network devices and/or third parties such as the resource 122 can request verification of the user's identity, for example by sending an identity verification request 124 to the orientation fingerprint service 112 and obtaining, from the orientation fingerprint service 112, an identity verification decision 126. It should be understood that this example is illustrative, and therefore should not be construed as being limiting in any way.

FIG. 1 illustrates one user device 102, one network 104, one server computer 114, one UBA module 120, and one resource 122. It should be understood, however, that various implementations of the operating environment 100 can include one or more than one user device 102; zero, one, or more than one network 104; one or more than one server computer 114; zero, one, or more than one UBA module 120; and/or zero, one, or more than one resource 122. As such, the illustrated embodiment should be understood as being illustrative, and should not be construed as being limiting in any way.

Figure 2:
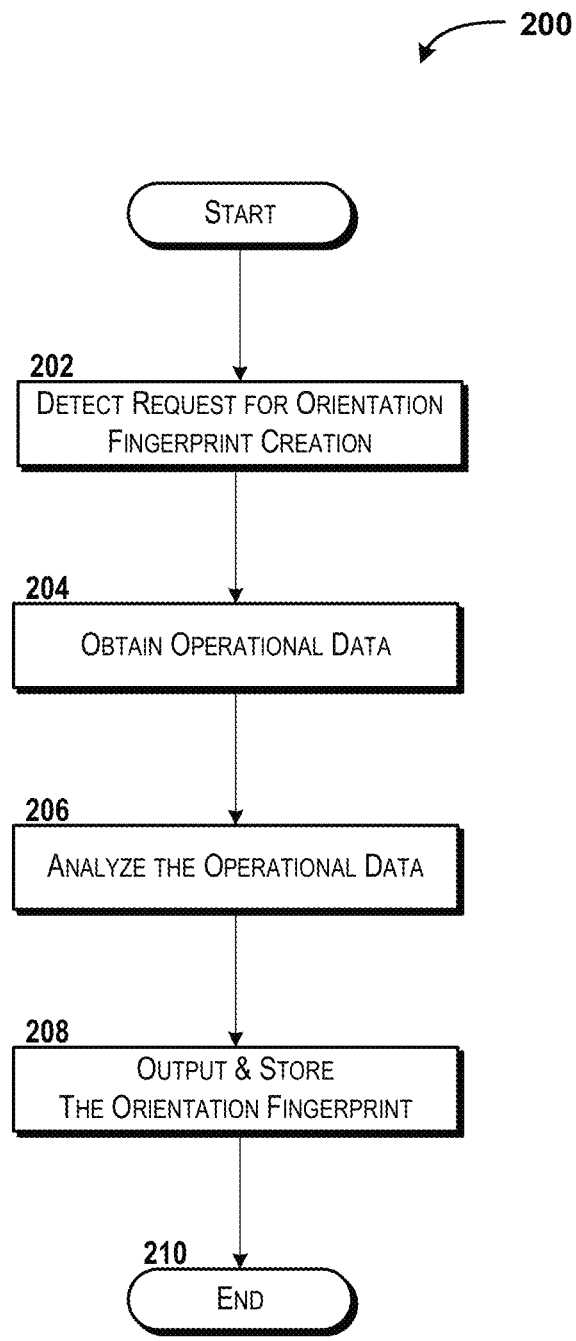
FIG. 2 is a flow diagram showing aspects of a method for creating an orientation fingerprint, according to an illustrative embodiment of the concepts and technologies described herein.

Turning now to FIG. 2, aspects of a method 200 for creating an orientation fingerprint 116 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 114, to perform one or more operations and/or causing the processor to direct other components of the computing system or device to perform one or more of the operations.

For purposes of illustrating and describing the concepts of the present disclosure, the method 200 is described herein as being performed by the server computer 114 via execution of one or more software modules such as, for example, the orientation fingerprint service 112. It should be understood that additional and/or alternative devices and/or network nodes can provide the functionality described herein via execution of one or more modules, applications, and/or other software including, but not limited to, the orientation fingerprint service 112. Thus, the illustrated embodiments are illustrative, and should not be viewed as being limiting in any way.

The method 200 begins at operation 202. At operation 202, the server computer 114 can detect a request for creation of an orientation fingerprint 116. The "request" for creation of the orientation fingerprint 116 can include an explicit request or an implicit request. In particular, in some embodiments the user device 102 can be configured to request creation of the orientation fingerprint 116 when the orientation tracking application 108 is installed or initialized; when an opt-in choice is made (e.g., via an exchange of messages, via a portal, via account settings, or the like); and/or at other times. Thus, it can be appreciated that the request (whether explicit or implicit) can be generated or triggered by activity at the user device 102, by interactions with the server computer 114, by interactions with the resource 122, and/or by other types of activities. Alternatively, the server computer 114 can "detect" the request by way of receiving operational data 110 from the user device 102, which as noted above can be delivered to the server computer 114 by the user device 102 (e.g., via execution of the orientation tracking application 108). As such, it can be appreciated that an actual "request" does not necessarily have to be received, and that the creation of the orientation fingerprint 116 can be prompted or triggered without an actual "request." Because the request to create the orientation fingerprint 116 can be detected and/or triggered in additional and/or alternative manners, it should be understood that the above examples are illustrative, and therefore should not be construed as being limiting in any way.

From operation 202, the method 200 can proceed to operation 204. At operation 204, the server computer 114 can obtain, from the user device 102, operational data 110. In some embodiments, the server computer 114 can request the operational data 110 from the user device 102, though this is not separately illustrated in FIG. 2. In other embodiments, the delivery of the operational data 110 can be triggered by the user device 102 via execution of the orientation tracking application 108 and/or via various interactions at and/or involving the user device 102. In one contemplated embodiment, for example, the user device 102 may determine, based on an interaction with the resource 122, that the operational data 110 should be obtained and shared with the orientation fingerprint service 112. Based on this determination, the user device 102 can deliver the operational data 110 to the server computer 114. It should be understood that this example embodiment is illustrative, and therefore should not be construed as being limiting in any way.

Regardless of how and/or why the operational data 110 is sent to the server computer 114, operation 204 can include the server computer 114 receiving the operational data 110. The operational data 110 can include orientation data, and the server computer 114 can be configured to associate the orientation data with a particular user or user device. In some embodiments, as explained above with reference to FIG. 1, the operational data 110 can include identity data, which can be used to associate the orientation data and/or other components of the operational data 110 with a particular user. Also, as noted above, the operational data 110 can be associated not only with a particular user, but also optionally with a particular device since a user may have two or more orientation fingerprints 116 for two or more devices. As such, it should be understood that this example is illustrative, and therefore should not be construed as being limiting in any way.

From operation 204, the method 200 can proceed to operation 206. At operation 206, the server computer 114 can analyze the operational data 110 obtained in operation 204. According to various embodiments of the concepts and technologies disclosed herein, the operational data 110 can be analyzed by the orientation fingerprint service 112, which can include one or more machine learning and/or artificial intelligence algorithms, logic, modules, and/or software for analyzing the operational data 110 to determine an orientation fingerprint 116 for the user of the user device 102. In particular, the operational data 110 can be analyzed by the orientation fingerprint service 112 to determine, based on the operational data 110, a model for orientation of the user device 102 (when used by a particular user).

In various embodiments of the concepts and technologies disclosed herein, the model can reflect orientation of the user device 102 through and/or during various types of uses. For example, the operational data 110 can indicate orientation data (e.g., roll, pitch, yaw; and/or other indications of orientation in a three-dimensional space) for the user device 102 when being used for a particular type of activity (e.g., speaking on the phone, speaking on a speakerphone, browsing the Internet, sending a text message, reviewing email, etc.). Thus, it can be appreciated that the orientation fingerprint 116 can reflect orientation of the user device 102 (when used by a particular user) for any number of uses, types of uses, and/or categories of uses.

In one example embodiment, the orientation fingerprint 116 can indicate, for example, a combination of angles (relative to the user) at which the user device 102 is held when composing a text message. Additionally, movements (e.g., small variations in orientation) can be tracked when a user is typing on a screen or keyboard of the user device 102, and these movements and/or orientation information can be stored as part of the orientation fingerprint 116. Thus, the orientation fingerprint 116 can model, for a particular user, how the user device 102 is held, moved, and/or oriented when being used for various types of activities. This model can be used at some time in the future to verify that the user device 102 is in the possession and/or use of the same user by comparing, to the orientation fingerprint 116, a new release of operational data 110 that includes orientation information for the user device 102 at some time in the future. As such, it can be appreciated that the orientation fingerprint 116 can be stored as a model that can include one or more algorithms and/or models for indicating orientation of the user device 102 when being used for a particular activity. The models can include one or more algorithms; one or more data structures; and/or one or more combinations of models and/or data. It should be understood that this example is illustrative, and therefore should not be construed as being limiting in any way.

From operation 206, the method 200 can proceed to operation 208. At operation 208, the server computer 114 can output and store the orientation fingerprint 116. According to various embodiments of the concepts and technologies disclosed herein, the server computer 114 can be configured to store the orientation fingerprint 116 with information that can identify the user with whom the models and/or or data that are included in the orientation fingerprint 116 are associated. In some embodiments, the user can be identified by a login and/or other information that may be created by the user device 102 and/or other devices. In one contemplated embodiment, the user may login to the orientation tracking application 108 using a login, biometric information, or the like; and the orientation tracking application 108 can report, e.g., as part of the operational data 110, the identity of the user. Thus, the orientation fingerprint 116 can include an identifier of a particular user, thereby enabling orientation of the user device 102 to be used to authenticate a user of a device (as opposed to merely a device) when desired. Because the identity of the user can be determined in additional and/or alternative manners, and because the identity and the orientation fingerprint 116 can be used for additional and/or alternative purposes, it should be understood that the above examples are illustrative, and therefore should not be construed as being limiting in any way.

From operation 208, the method 200 can proceed to operation 210. The method 200 can end at operation 210.

Figure 3:
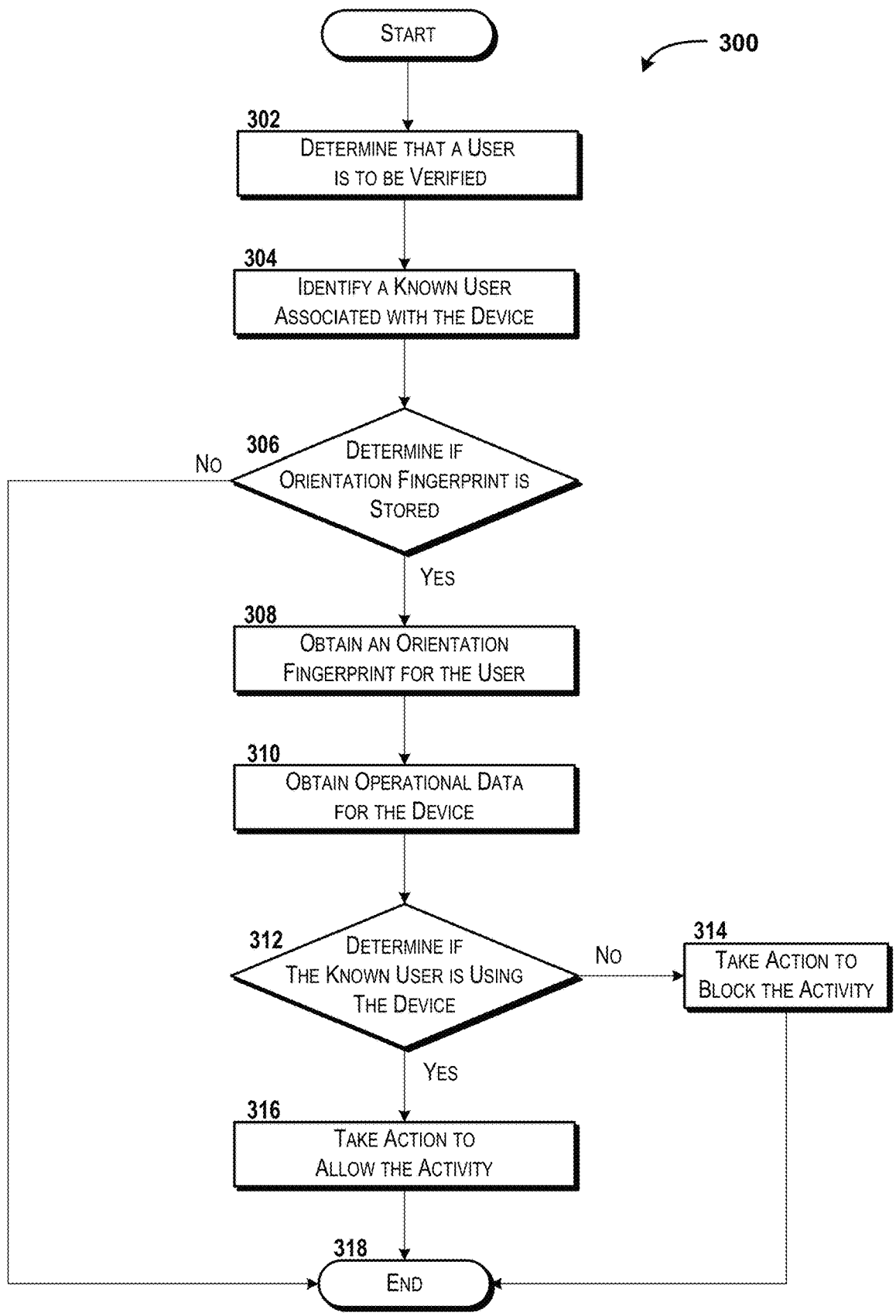
FIG. 3 is a flow diagram showing aspects of a method for using an orientation fingerprint, according to an illustrative embodiment of the concepts and technologies described herein.

Turning now to FIG. 3, aspects of a method 300 for using an orientation fingerprint 116 will be described in detail, according to an illustrative embodiment. For purposes of illustrating and describing the concepts of the present disclosure, the method 300 is described herein as being performed by the server computer 114 via execution of one or more software modules such as, for example, the orientation fingerprint service 112. It should be understood that additional and/or alternative devices and/or network nodes can provide the functionality described herein via execution of one or more modules, applications, and/or other software including, but not limited to, the orientation fingerprint service 112. Thus, the illustrated embodiments are illustrative, and should not be viewed as being limiting in any way.

The method 300 begins at operation 302. At operation 302, the server computer 114 can determine that a user associated with a device (e.g., the user device 102) and/or activity should be verified. In some embodiments, for example, the server computer 114 may receive a verification request from one or more entities. In some other embodiments, the server computer 114 may determine on its own that certain activity and/or a user associated with a user device 102 should be verified. Because the determination that a user or some activity should be verified can occur at various times and/or under various circumstances, it should be understood that the examples herein are illustrative, and therefore should not be construed as being limiting in any way.

In some example embodiments, a verification request may be received by the server computer 114 in operation 302. The verification request can include an explicit request to verify a user or activity. For example, the verification request can include the identity verification request 124 illustrated and described above with reference to FIG. 1. Thus, the determination of operation 302 can be made by the server computer 114 by receiving a request such as the identity verification request 124, e.g., from the resource 122, to verify the user associated with a particular device and/or with certain activity.

In some other embodiments, the determination of operation 302 can be made by the server computer 114 without an explicit request. For example, the server computer 114 can determine that the user associated with activity and/or a device (e.g., the user device 102) should be verified based on certain types of activities, based on time intervals, or the like. In yet other embodiments, the server computer 114 can compare orientation of a user device 102 at various times to an orientation fingerprint 116, comparing orientation of the user device 102 upon a trigger event to an orientation fingerprint 116, etc., thereby obviating an actual "request," call, or command as such.

In some contemplated embodiments, the determination of operation 302 can be made by receiving, from the UBA module 120, a request or service call that indicates that some behavioral anomaly has been noted with the user device 102. In response to this indication, the server computer 114 can perform the orientation analysis illustrated and described herein to determine if the known user is using the user device 102 when the anomalous behavior was detected. It should be understood that this example is illustrative, and therefore should not be construed as being limiting in any way.

From operation 302, the method 300 can proceed to operation 304. At operation 304, the server computer 114 can identify a known user associated with the device being used for the device activity, e.g., the user device 102. In some embodiments, the server computer 114 can perform the functionality of operation 304 by communicating with the user device 102 and/or the resource 122 to identify the user (e.g., by login information, biometric information, etc.). In some other embodiments, the server computer 114 can receive identity information with a request (e.g., an identity verification request 124) that may be received as part of operation 302. In some other embodiments, the server computer 114 can communicate with other devices and/or entities to determine an identity associated with the user device 102. Thus, it can be appreciated that the server computer 114 can determine a user or identity associated with the user device 102 in any number of manners. As such, it should be understood that the above examples are illustrative, and therefore should not be construed as being limiting in any way.

From operation 304, the method 300 can proceed to operation 306. At operation 306, the server computer 114 can determine if the user identified in operation 304 is associated with a stored orientation fingerprint 116. The server computer 114 can access one or more stored orientation fingerprints 116 and determine if one or more of the stored orientation fingerprints 116 is associated with the user or identity determined in operation 304. As noted above, the orientation fingerprints 116 can be stored in some embodiments with data that can identify an associated user or identity. As such, operation 306 can correspond to the server computer 114 accessing the orientation fingerprints 116 and determining, based on associated user and/or identity information, if any orientation fingerprint 116 is stored for the user or identity determined in operation 304.

If the server computer 114 determines, in operation 306, that an orientation fingerprint 116 associated with the user identified in operation 304 is not stored, the method 300 can proceed to operation 318, and the method 300 can end. If the server computer 114 determines, in operation 306, that an orientation fingerprint 116 associated with the user identified in operation 304 is stored, the method 300 can proceed to operation 308. At operation 308, the server computer 114 can obtain the orientation fingerprint 116 for the user identified in operation 304. In operation 308, the server computer 114 can retrieve the orientation fingerprint 116 from memory, from a data storage device, and/or elsewhere. It can be appreciated that the orientation fingerprint 116 can include more than one piece of data. For example, the orientation fingerprint 116 can include multiple models including algorithms, data sets, data structures, and/or the like. Thus, the server computer 114 can retrieve or obtain, in operation 308, one or more pieces of data, software code, algorithms, data structures, combinations thereof, or the like, which can correspond to the orientation fingerprint 116 for the user identified in operation 304.

From operation 308, the method 300 can proceed to operation 310. At operation 310, the server computer 114 can obtain operational data 110 for the device. According to various embodiments of the concepts and technologies disclosed herein, the server computer 114 can be configured to issue, to the user device 102 (or other device for which the user or activity is being verified), one or more commands 118 for obtaining the operational data 110. Thus, it can be appreciated that the server computer 114 can obtain the operational data 110, in some embodiments, in response to a request or command 118 to provide the operational data 110. In some other embodiments, the user device 102 can be configured to provide the operational data 110 to the server computer 114 periodically, in which case no request or command 118 may be issued by the server computer 114 to obtain the operational data 110. Regardless of whether the operational data 110 is requested or provided automatically, the server computer 114 can receive the operational data 110 in operation 310.

From operation 310, the method 300 can proceed to operation 312. At operation 312, the server computer 114 can determine if the known user (e.g., the user associated with the orientation fingerprint 116 obtained in operation 308) is using the device associated with the activity being verified. The determination of operation 312 can include the server computer 114 comparing the orientation fingerprint 116 to the operational data 110 to determine if the orientation of the user device 102 matches what would be expected of the known users based on the orientation fingerprint 116.

In some embodiments of the concepts and technologies disclosed herein, the use associated with the user device 102 (e.g., the activity being verified) can be provided to (e.g., as input), fed to, and/or loaded to a model that corresponds to the orientation fingerprint 116 and the expected orientation can be output by the model. The server computer 114 can then compare the actual orientation from the operational data 110 to the output to see if the output matches the actual orientation. If the actual orientation matches the output, or falls within a defined threshold or confidence interval, the user of the user device 102 can be verified as the known user. It should be understood that models can be used to evaluate orientation in other ways, and therefore this example implementation of the orientation fingerprint 116 is illustrative. As such, this embodiment should not be construed as being limiting in any way.

In some other embodiments, the orientation fingerprint 116 can be analyzed to determine what kind of orientation would be expected for a particular activity (e.g., the activity being verified by way of the method 300). The expected orientation can be compared to the actual orientation from the operational data 110 and the activity can be verified if the actual orientation matches the expected orientation and/or may not be verified if the actual orientation does not match the expected orientation. Because the orientation fingerprint 116 can be used to determine if the known user is using the device in additional and/or alternative manners, it should be understood that these example embodiments are illustrative, and therefore should not be construed as being limiting in any way.

If the server computer 114 determines, in operation 312, that the known user is not using the user device 102, the method 300 can proceed to operation 314. At operation 314, the server computer 114 can take or trigger one or more actions to block the activity in question. In some embodiments, the server computer 114 can perform operation 314 by issuing an identity verification decision 126 that indicates that the user or activity is not verified. In some other embodiments, the server computer 114 can trigger the blocking of the activity. In yet other embodiments, the server computer 114 can issue a command 118 to the user device 102, and the user device 102 can (e.g., via execution of the orientation tracking application 108) block the activity. Because the activity can be blocked in additional and/or alternative manners, it should be understood that these examples are illustrative, and therefore should not be construed as being limiting in any way.

If the server computer 114 determines, in operation 312, that the known user is using the user device 102, the method 300 can proceed to operation 316. At operation 316, the server computer 114 can take or trigger one or more actions to allow the activity in question. In some embodiments, the server computer 114 can perform operation 316 by issuing an identity verification decision 126 that indicates that the user or activity is verified. In some other embodiments, the server computer 114 can trigger the allowing of the activity. In yet other embodiments, the server computer 114 can issue a command 118 to the user device 102, and the user device 102 can (e.g., via execution of the orientation tracking application 108) allow the activity. Because the activity can be allowed in additional and/or alternative manners, it should be understood that these examples are illustrative, and therefore should not be construed as being limiting in any way.

From operation 316, the method 300 can proceed to operation 318. The method 300 also can proceed to operation 318 from operation 306, if the server computer 114 determines, in operation 306, that the user's orientation fingerprint 116 is not stored. The method 300 also can proceed to operation 318 from operation 314. The method 300 can end at operation 318.

Figure 4:
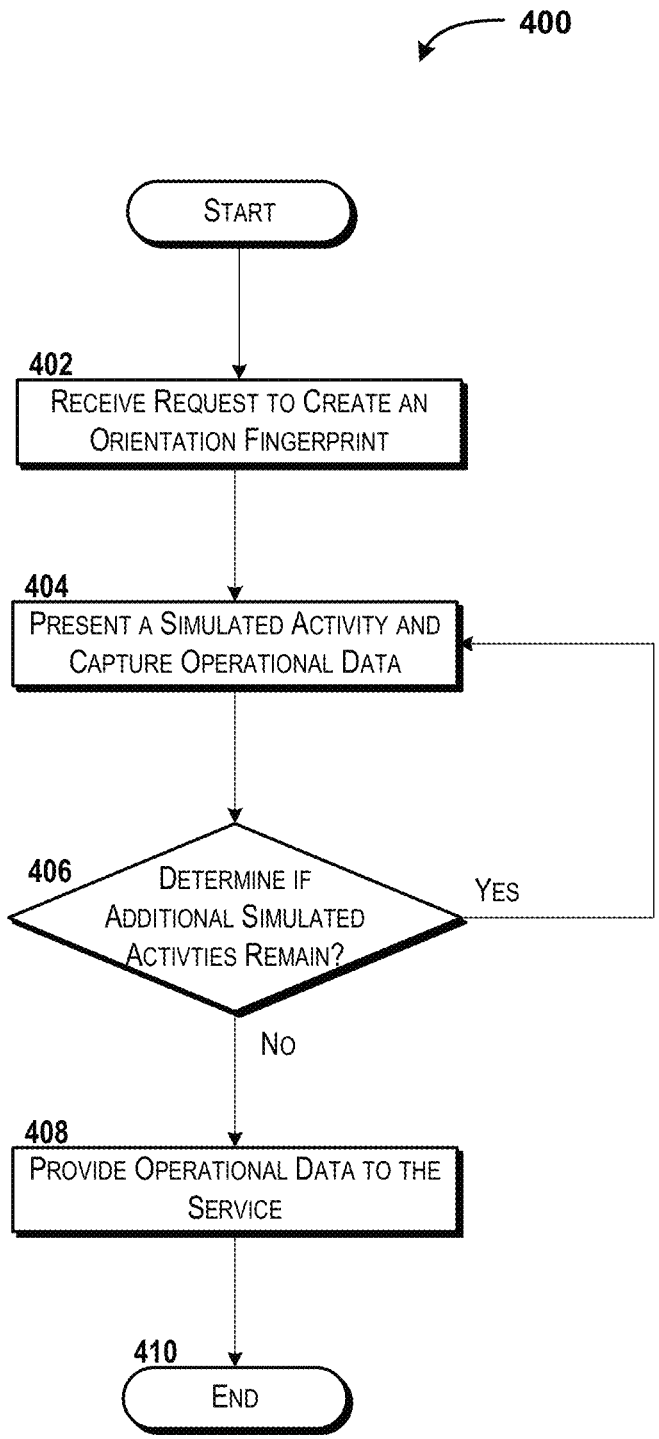
FIG. 4 is a flow diagram showing aspects of a method for creating an orientation fingerprint, according to an illustrative embodiment of the concepts and technologies described herein.

Turning now to FIG. 4, aspects of a method 400 for creating an orientation fingerprint 116 will be described in detail, according to an illustrative embodiment. For purposes of illustrating and describing the concepts of the present disclosure, the method 400 is described herein as being performed by the user device 102 via execution of one or more software modules such as, for example, the orientation tracking application 108. It should be understood that additional and/or alternative devices and/or network nodes can provide the functionality described herein via execution of one or more modules, applications, and/or other software including, but not limited to, the orientation tracking application 108. Thus, the illustrated embodiments are illustrative, and should not be viewed as being limiting in any way.

The method 400 begins at operation 402. At operation 402, the user device 102 can detect a request to create an orientation fingerprint 116. According to some embodiments of the concepts and technologies disclosed herein, the request can be detected by the user device 102 by detecting installation and/or activation of the orientation tracking application 108; when an opt-in choice is made at the user device 102 (e.g., via an exchange of messages with the orientation fingerprint service 112, via a portal, via account settings, or the like); via selection of an option to create the orientation fingerprint 116 (e.g., within the orientation tracking application 108 as will be illustrated and described with reference to FIGS. 5A-5G); and/or at other times. As such, it can be appreciated that the user device 102 can detect a request to create the orientation fingerprint 116 in various manners and/or via various interactions at the user device 102.

From operation 402, the method 400 can proceed to operation 404. At operation 404, the user device 102 can present a simulated activity and capture operational data 110. According to various embodiments of the concepts and technologies disclosed herein, the user device 102 can be configured (e.g., via execution of the orientation tracking application 108) to perform various simulated activities, which can approximate certain device activities. During performance of the simulated activities, the user device 102 can track and/or capture operational data 110 including, for example, orientation of the user device 102, activity information that describes the activity occurring, and the like. According to some embodiments, a simulated activity can include a simulated call and/or discussion, a simulated text exchange, a simulated web browsing session, a simulated email session, other simulated activities, or the like. Some example simulated activities, which can be used during a training operation, are illustrated and described in more detail below with reference to FIGS. 5A-5G and elsewhere herein. Thus, operation 404 can correspond to the user device 102 performing one of the simulated activities of a training operation and capturing the operational data 110 during the simulated activity.

From operation 404, the method 400 can proceed to operation 406. At operation 406, the user device 102 can determine if an additional simulated activity remains for presentation at the user device 102. This determination can be made in various manners. For example, the user device 102 can track how many simulated activities have been performed and how many simulated activities are to be completed for the creation of the orientation fingerprint 116. Alternatively, the user device 102 can determine that additional operations exist based on other considerations. Regardless, operation 406 can correspond to the user device 102 determining if additional simulated activities are to be completed or are not to be completed.

If the user device 102 determines, in operation 406, that additional simulated activities remain for presentation at the user device 102, the method 400 can return to operation 404, and the user device 102 can present another simulated activity and can capture operational data 110 during the presentation or performance of the other simulated activity. Thus, it can be appreciated that operations 404-406 can be iterated until the user device 102 determines, in any iteration of operation 406, that no more simulated activities remain.

If the user device 102 determines, in operation 406, that additional simulations do not remain for presentation at the user device 102, the method 400 can proceed to operation 408. At operation 408, the user device 102 can provide operational data 110 to the orientation fingerprint service 112. Thus, operation 408 can correspond to the user device 102 packaging the operational data 110 captured during the performance of operations 404-406 and providing that operational data 110 to the recipients.

From operation 408, the method 400 can proceed to operation 410. The method 400 can end at operation 410.

Figure 5A:
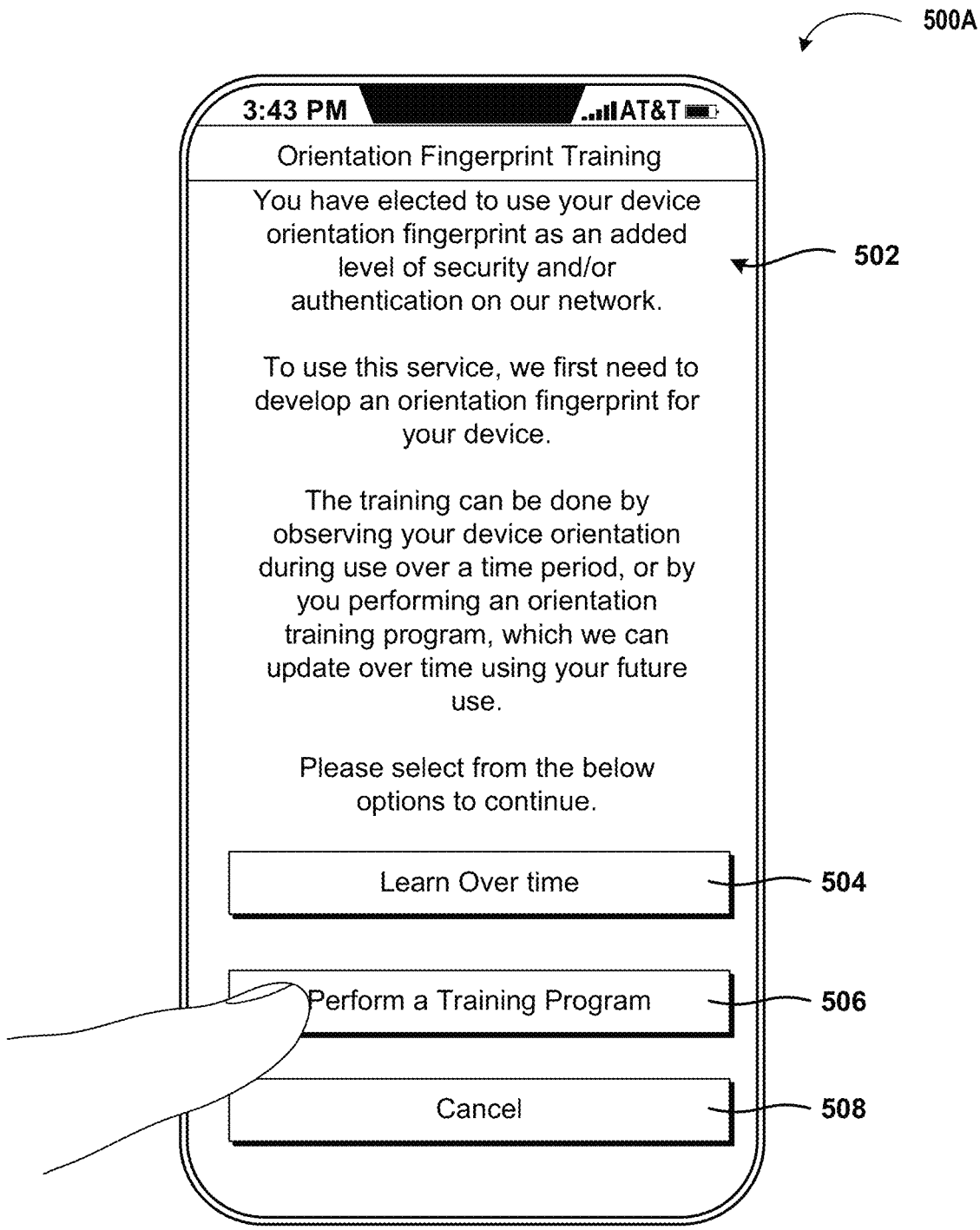
FIGS. 5A-5G are user interface diagrams showing various screen displays for use in creating and using device orientation fingerprints, according to some illustrative embodiments of the concepts and technologies described herein.

FIGS. 5A-5G are user interface ("UI") diagrams showing aspects of UIs for using and/or interacting with orientation fingerprint service 112 and/or the orientation tracking application 108, according to some illustrative embodiments. FIG. 5A shows an illustrative screen display 500A. According to some embodiments of the concepts and technologies described herein, the screen display 500A can be generated by a device such as the user device 102 via interactions with the orientation fingerprint service 112 and/or the orientation tracking application 108. In particular, according to various embodiments, the user device 102 can generate the screen display 500A and/or other screen displays in conjunction with and/or based upon interactions with the orientation tracking application 108 described herein, which can be configured to render the screen display 500A using data generated at the user device 102 and/or using data provided by the orientation fingerprint service 112. It should be appreciated that the UI diagram illustrated in FIG. 5A is illustrative of one contemplated example of the UIs that can be generated and/or displayed in accordance with the concepts and technologies disclosed herein, and therefore should not be construed as being limiting in any way.

According to various embodiments, the screen display 500A can be presented, for example, when the orientation tracking application 108 is installed, when the orientation tracking application 108 is started, when a user selects an option to train the orientation fingerprint service 112 or the orientation tracking application 108, and/or at other times. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include an orientation fingerprint creation window 502. The orientation fingerprint creation window 502 can be configured to determine how a user wishes to create the orientation fingerprint 116 and/or to guide a user through a training process for the orientation fingerprint 116 if desired. The orientation fingerprint creation window 502 can include a learn over time UI control 504. The learn over time UI control 504 can be selectable by a user or other entity to inform the orientation tracking application 108 and/or the orientation fingerprint service 112 to obtain orientation information over time for the user device 102 and to create the orientation fingerprint 116 as the user device 102 is used over time. It should be understood that this example is illustrative and therefore should not be construed as being limiting in any way.

As shown in FIG. 5A, the orientation fingerprint creation window 502 also includes a perform a training program UI control 506. The perform a training program UI control 506 can be selected to cause the user device 102 to begin a training program (to create the orientation fingerprint 116).

It should be understood that this example is illustrative and therefore should not be construed as being limiting in any way.

The orientation fingerprint creation window 502 also can include a UI control 508 to cancel the training and/or capture of the orientation fingerprint 116. Selection of the UI control 508 can cause the user device 102 to hide the orientation fingerprint creation window 502, exit the orientation tracking application 108, and/or perform additional and/or alternative actions. Because additional or alternative controls can be included in the orientation fingerprint creation window 502, it should be understood that the example embodiment shown in FIG. 5A is illustrative and therefore should not be construed as being limiting in any way.

Figure 5B:
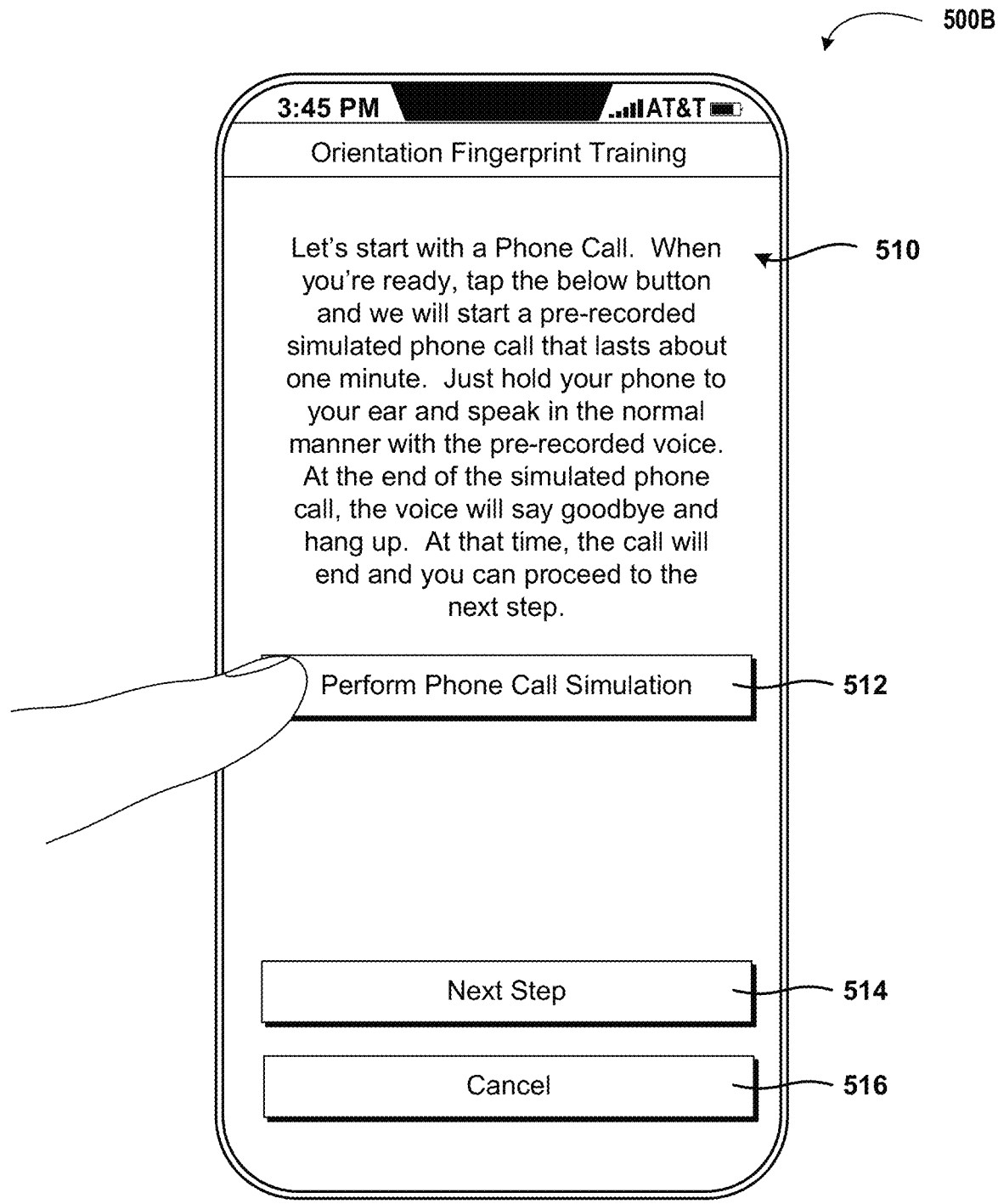

FIG. 5B shows an illustrative screen display 500B. According to some embodiments of the concepts and technologies described herein, the screen display 500B can be generated by a device such as the user device 102 via interactions with the orientation fingerprint service 112 and/or the orientation tracking application 108. In particular, according to various embodiments, the user device 102 can generate the screen display 500B and/or other screen displays in response to a user or other entity selecting the perform a training program UI control 506 illustrated and described above with reference to FIG. 5A. Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include an orientation fingerprint training program window 510. The orientation fingerprint training program window 510 can be configured to present the simulated actions to the user, during which the orientation tracking application 108 can capture operational data 110 for the user to associate a certain orientation with a certain activity. The orientation fingerprint training program window 510 can include a perform phone call simulation UI control 512. The perform phone call simulation UI control 512 can be selectable by a user or other entity to cause the user device 102 to present a simulated phone call, during which the user device 102 can capture orientation information that can be used by the orientation tracking application 108 and/or the orientation fingerprint service 112 to create the orientation fingerprint 116. The orientation in which a device is held during phone calls may vary widely among users of devices and therefore may be used as part of the orientation fingerprint 116 to authenticate a user and/or activity on the user device 102.

According to some contemplated embodiments of the concepts and technologies disclosed herein, the simulated phone call can include a recording with a fictitious conversation. During the conversation, the recorded voice may start a conversation with the user about any topic (e.g., "the weather here is hot today, what is your weather like there," "please tell me about where you're from," or the like). Thus, the user who is performing the training can engage in a "conversation" that may approximate use of the phone for a phone call. During this "conversation," the user device 102 can record orientation information relating to the user device 102 and store that information as the operational data 110. It should be understood that this example is illustrative and therefore should not be construed as being limiting in any way.

As shown in FIG. 5B, the orientation fingerprint training program window 510 also includes next step UI control 514.

The next step UI control 514 can be selected to cause the user device 102 to go to a next step of the training program, in some embodiments. In some embodiments, though not visible in FIG. 5B, the next step UI control 514 may not be selectable (e.g., may be grayed out and/or locked, etc.) until the perform phone call simulation UI control 512 is selected and the simulated phone call has been completed. As such, it should be understood that the illustrated example is illustrative and therefore should not be construed as being limiting in any way.

The orientation fingerprint training program window 510 also can include a cancel training UI control 516. Selection of the cancel training UI control can cause the user device 102 to stop the training of the orientation fingerprint 116, to pause the creation of the orientation fingerprint 116, and/or to perform other actions. Thus, selection of the cancel training UI control 516 can cause the user device 102 to hide the orientation fingerprint training program window 510, to exit the orientation tracking application 108, and/or to perform additional and/or alternative actions. Because additional or alternative controls can be included in the orientation fingerprint training program window 510, it should be understood that the example embodiment shown in FIG. 5B is illustrative and therefore should not be construed as being limiting in any way.

Figure 5C:
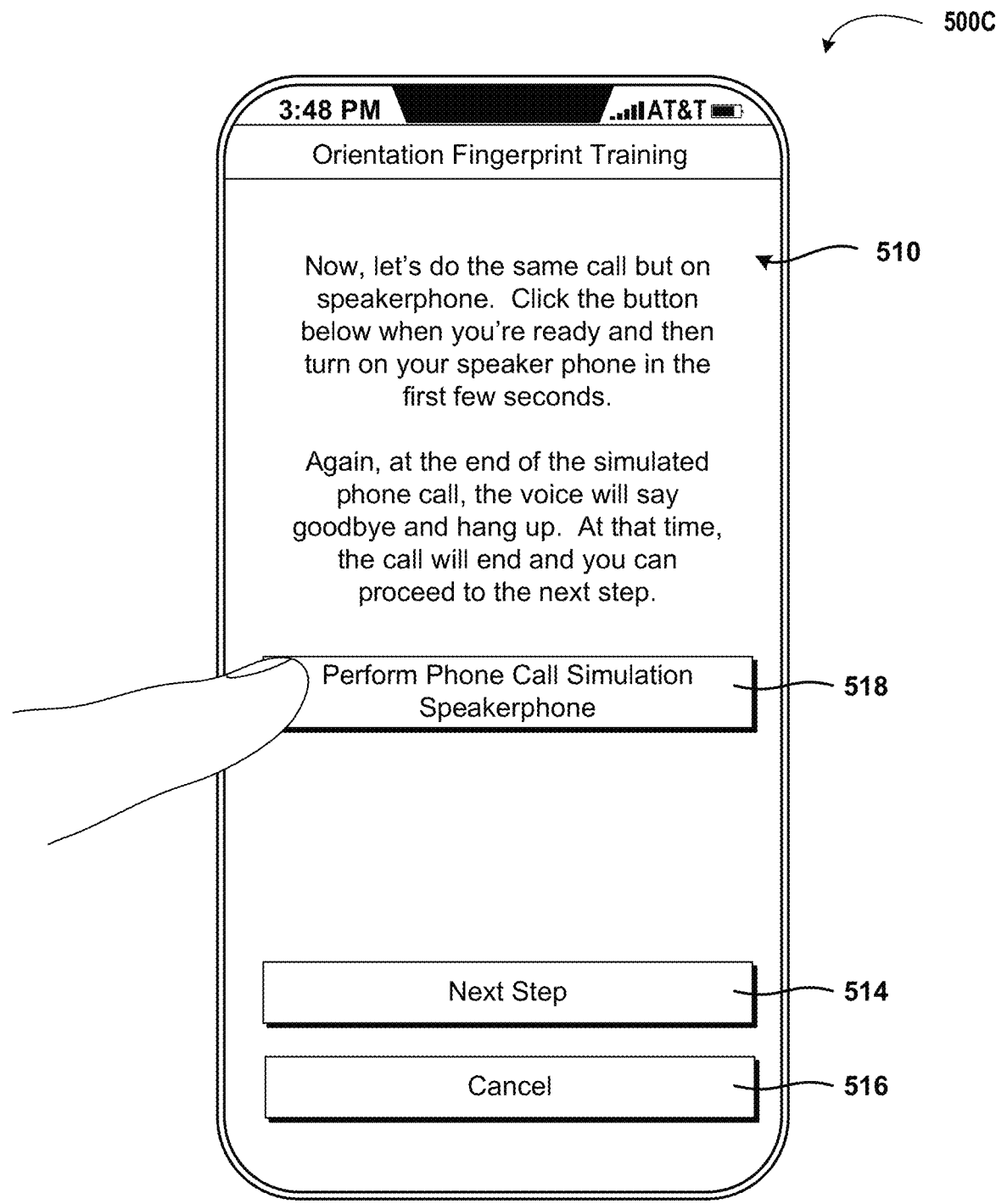

FIG. 5C shows an illustrative screen display 500C. According to some embodiments of the concepts and technologies described herein, the screen display 500C can be generated by a device such as the user device 102 via interactions with the orientation fingerprint service 112 and/or the orientation tracking application 108. In particular, according to various embodiments, the user device 102 can generate the screen display 500C and/or other screen displays in response to a user or other entity selecting the next step UI control 514 illustrated and described above with reference to FIG. 5B. Because the screen display 500C illustrated in FIG. 5C can be displayed at additional and/or alternative times, it should be understood that this examples are illustrative and therefore should not be construed as being limiting in any way.

The screen display 500C can include an updated version of the orientation fingerprint training program window 510. The orientation fingerprint training program window 510 can include a perform speakerphone simulation UI control 518. The perform speakerphone simulation UI control 518 can be selectable by a user or other entity to cause the user device 102 to present a simulated phone call using the device speakerphone, during which the user device 102 can capture orientation information that can be used by the orientation tracking application 108 and/or the orientation fingerprint service 112 to create the orientation fingerprint 116. The orientation in which a device is held during speakerphone calls may vary widely among users of devices and therefore may be used as part of the orientation fingerprint 116 to authenticate a user and/or activity on the user device 102.

According to some contemplated embodiments of the concepts and technologies disclosed herein, the simulated phone call can be the same or similar as the phone call presented in FIG. 5B, and therefore can include a recording with a fictitious conversation. In some other embodiments, a different conversation can be presented. During the conversation, the recorded voice may start a conversation with the user about any topic (e.g., "the weather here is hot today, what is your weather like there," "please tell me about where you're from," or the like). Thus, the user who is performing the training can engage in a "conversation" that may approximate use of the phone for a phone call using the speakerphone feature. During this "conversation," the user device 102 can record orientation information relating to the user device 102 and store that information as the operational data 110. It should be understood that this example is illustrative and therefore should not be construed as being limiting in any way.

As shown in FIG. 5C, the orientation fingerprint training program window 510 also includes the next step UI control 514, the selection of which can cause the user device 102 to go to a next step of the training program, in some embodiments. In some embodiments, the next step UI control 514 may not be selectable (e.g., may be grayed out and/or locked, etc.) until the perform speakerphone simulation UI control 518 is selected and the simulated phone call has been completed. As such, it should be understood that the illustrated example is illustrative and therefore should not be construed as being limiting in any way.

The orientation fingerprint training program window 510 also can include the cancel training UI control 516, which as noted before, can be selected to cause the user device 102 to stop the training of the orientation fingerprint 116, to pause the creation of the orientation fingerprint 116, and/or to perform other actions. Thus, selection of the cancel training UI control 516 can cause the user device 102 to hide the orientation fingerprint training program window 510, to exit the orientation tracking application 108, and/or to perform additional and/or alternative actions. Because additional or alternative controls can be included in the orientation fingerprint training program window 510, it should be understood that the example embodiment shown in FIG. 5C is illustrative and therefore should not be construed as being limiting in any way.

Figure 5D:
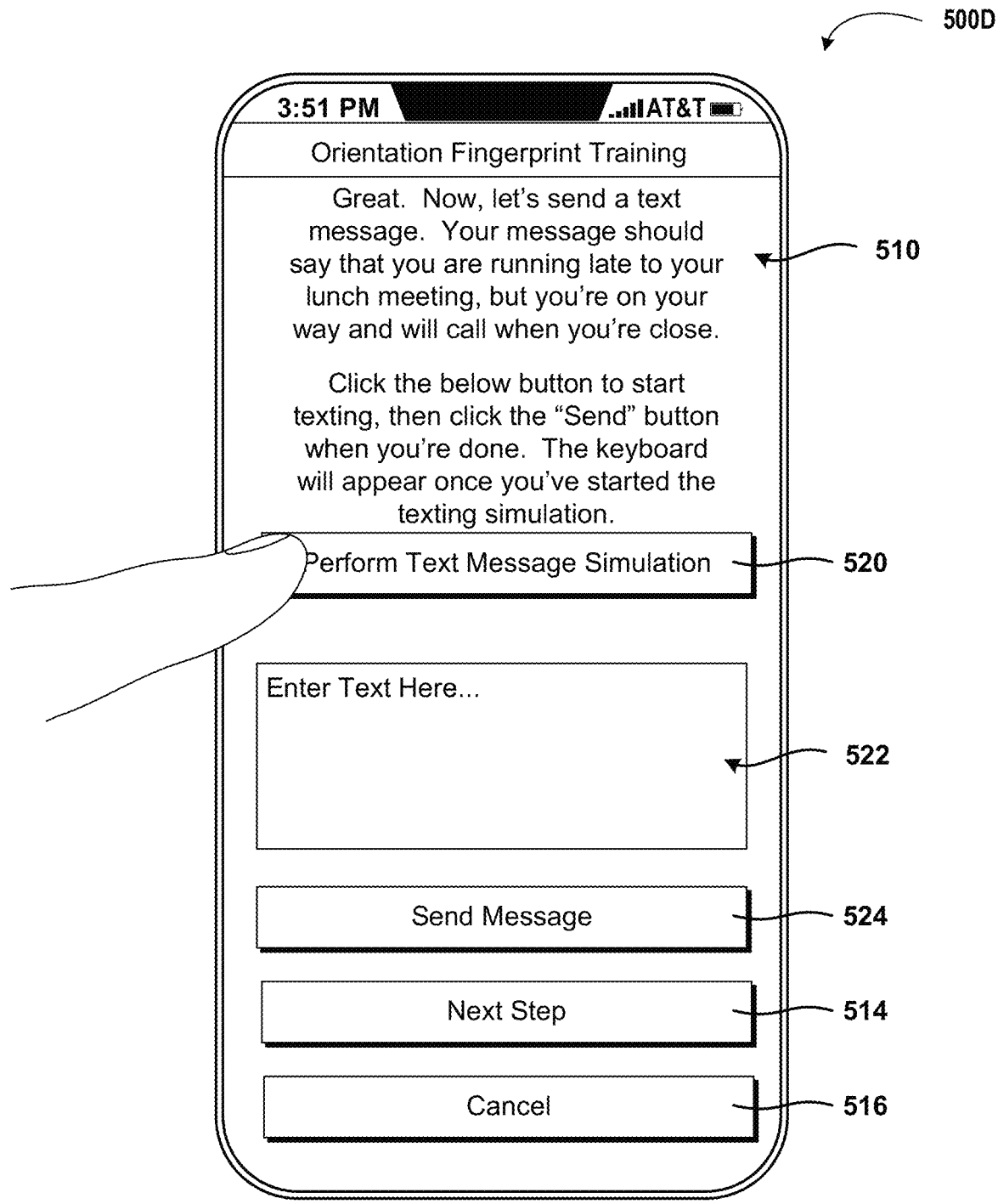

FIG. 5D shows an illustrative screen display 500D. According to some embodiments of the concepts and technologies described herein, the screen display 500D can be generated by a device such as the user device 102 via interactions with the orientation fingerprint service 112 and/or the orientation tracking application 108. In particular, according to various embodiments, the user device 102 can generate the screen display 500D and/or other screen displays in response to a user or other entity selecting the next step UI control 514 illustrated and described above with reference to FIG. 5C. Because the screen display 500D illustrated in FIG. 5D can be displayed at additional and/or alternative times, it should be understood that these examples are illustrative and therefore should not be construed as being limiting in any way.

The screen display 500D can include an updated version of the orientation fingerprint training program window 510. The orientation fingerprint training program window 510 can include a perform text message UI control 520. The perform text message UI control 520 can be selectable by a user or other entity to cause the user device 102 to present a simulated text message exchange, during which the user device 102 can capture orientation information that can be used by the orientation tracking application 108 and/or the orientation fingerprint service 112 to create the orientation fingerprint 116. It can be appreciated that the orientation of the user device 102 during the simulated text message exchange can relate not only to an angle at which the user holds the user device 102 during texting, but also to movements of the device during typing, which may vary widely among users of devices and therefore may be used as part of the orientation fingerprint 116 to authenticate a user and/or activity on the user device 102.

According to some contemplated embodiments of the concepts and technologies disclosed herein, the simulated text exchange can be one sided (e.g., as in the example shown in FIG. 5D, where the user is instructed to author a text message with certain content), or two sided, where messages are "received" and the user responds to those messages. Thus, the text exchange can be configured to last a certain amount of time. Upon selecting the perform text message UI control 520, the user device 102 can activate a text field 522 and display a keyboard (not shown in FIG. 5D) so that the user can type. It should be understood that this example is illustrative and therefore should not be construed as being limiting in any way.

As shown in FIG. 5D, the orientation fingerprint training program window 510 also includes the next step UI control 514, the selection of which can cause the user device 102 to go to a next step of the training program, in some embodiments. In some embodiments, the next step UI control 514 may not be selectable (e.g., may be grayed out and/or locked, etc.) until the perform text message UI control 520 is selected and the simulated text or message exchange has been completed. As such, it should be understood that the illustrated example is illustrative and therefore should not be construed as being limiting in any way.

The orientation fingerprint training program window 510 also can include the cancel training UI control 516, which as noted before, can be selected to cause the user device 102 to stop the training of the orientation fingerprint 116, to pause the creation of the orientation fingerprint 116, and/or to perform other actions. Thus, selection of the cancel training UI control 516 can cause the user device 102 to hide the orientation fingerprint training program window 510, to exit the orientation tracking application 108, and/or to perform additional and/or alternative actions. Because additional or alternative controls can be included in the orientation fingerprint training program window 510, it should be understood that the example embodiment shown in FIG. 5D is illustrative and therefore should not be construed as being limiting in any way.

Figure 5E:
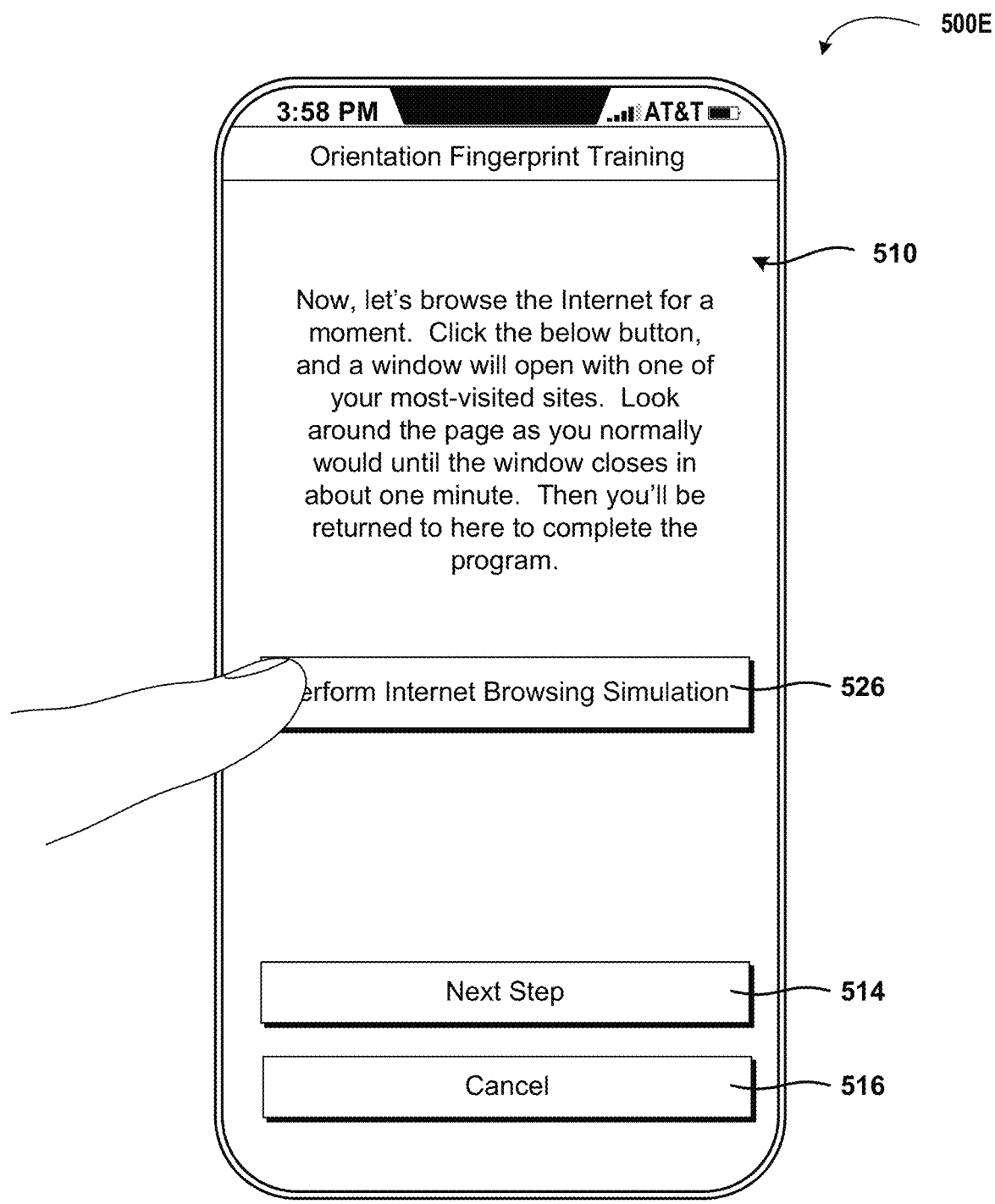

FIG. 5E shows an illustrative screen display 500E. According to some embodiments of the concepts and technologies described herein, the screen display 500E can be generated by a device such as the user device 102 via interactions with the orientation fingerprint service 112 and/or the orientation tracking application 108. In particular, according to various embodiments, the user device 102 can generate the screen display 500E and/or other screen displays in response to a user or other entity selecting the next step UI control 514 illustrated and described above with reference to FIG. 5D. Because the screen display 500E illustrated in FIG. 5E can be displayed at additional and/or alternative times, it should be understood that these examples are illustrative and therefore should not be construed as being limiting in any way.

The screen display 500E can include an updated version of the orientation fingerprint training program window 510. The orientation fingerprint training program window 510 can include a perform Internet browsing UI control 526. The perform Internet browsing UI control 526 can be selectable by a user or other entity to cause the user device 102 to present a simulated Internet browsing session, during which the user device 102 can capture orientation information that can be used by the orientation tracking application 108 and/or the orientation fingerprint service 112 to create the orientation fingerprint 116. It can be appreciated that the orientation of the user device 102 during the simulated Internet browsing session can relate not only to an angle at which the user holds the user device 102 during browsing, but also to movements of the device during typing, scrolling, reading, and/or other activities, which may vary widely among users of devices and therefore may be used to authenticate a user and/or activity on the user device 102.

According to some contemplated embodiments of the concepts and technologies disclosed herein, the simulated Internet browsing can include downloading a web site (e.g., one or more websites from a user's favorites and/or most-visited sites), and allowing the user to read through the sites for a certain amount of time (e.g., one minute, two minutes, five minutes, or the like). In the illustrated embodiment shown in FIG. 5E, the user is instructed to read through the displayed web page until the window closes in about one minute. It should be understood that this example is illustrative, and therefore should not be construed as being limiting in any way. Upon selecting the perform Internet browsing UI control 526, the user device 102 can activate a browser window and display the web site so the user can read. It should be understood that this example is illustrative and therefore should not be construed as being limiting in any way.

As shown in FIG. 5E, the orientation fingerprint training program window 510 also includes the next step UI control 514, the selection of which can cause the user device 102 to go to a next step of the training program, in some embodiments. In some embodiments, the next step UI control 514 may not be selectable (e.g., may be grayed out and/or locked, etc.) until the perform Internet browsing UI control 526 is selected and the sample web page has been retrieved, displayed, and read and/or otherwise interacted with for the requisite time. As such, it should be understood that the illustrated example is illustrative and therefore should not be construed as being limiting in any way.

The orientation fingerprint training program window 510 also can include the cancel training UI control 516, which as noted before, can be selected to cause the user device 102 to stop the training of the orientation fingerprint 116, to pause the creation of the orientation fingerprint 116, and/or to perform other actions. Thus, selection of the cancel training UI control 516 can cause the user device 102 to hide the orientation fingerprint training program window 510, to exit the orientation tracking application 108, and/or to perform additional and/or alternative actions. Because additional or alternative controls can be included in the orientation fingerprint training program window 510, it should be understood that the example embodiment shown in FIG. 5E is illustrative and therefore should not be construed as being limiting in any way.

Figure 5F:
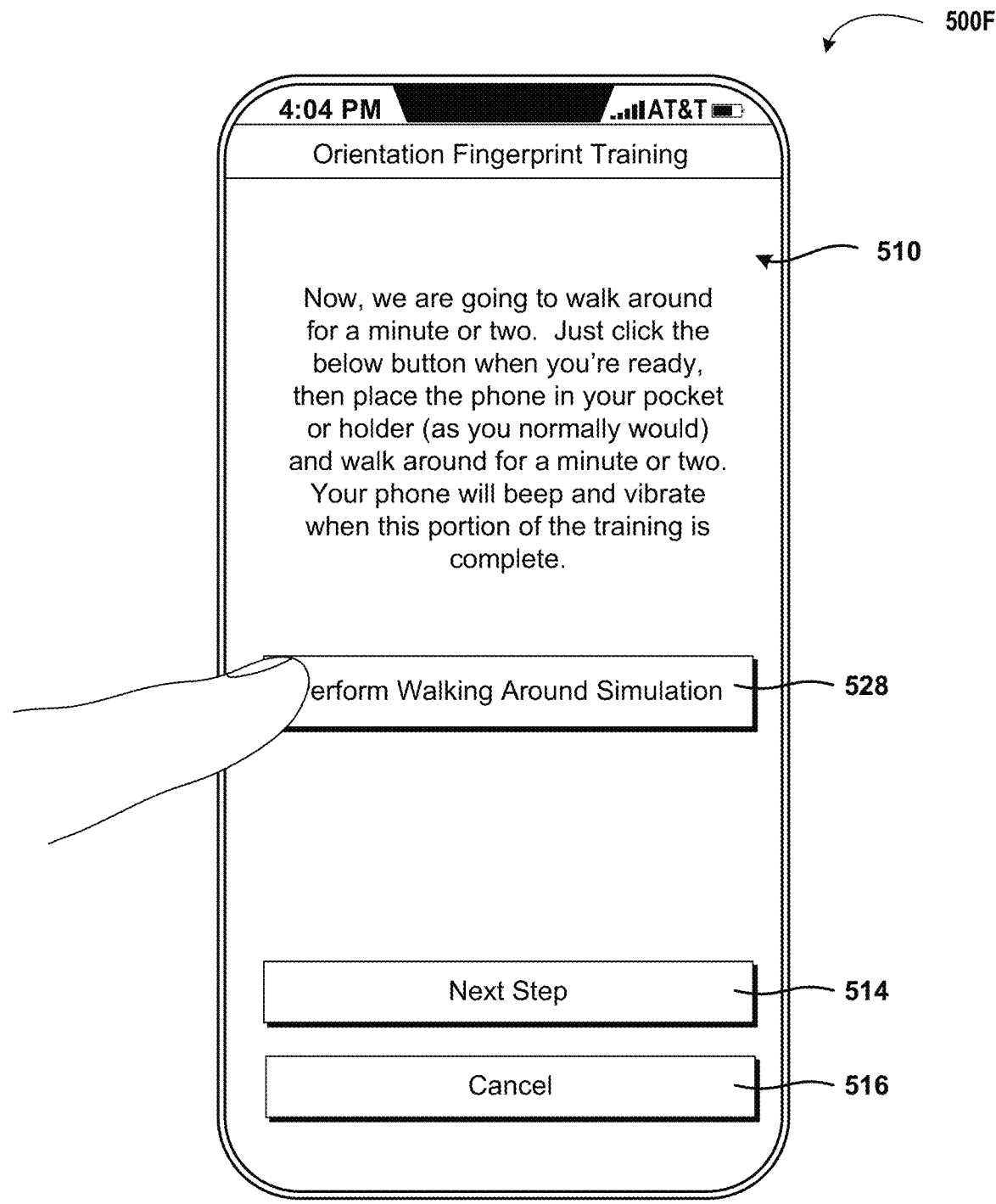

FIG. 5F shows an illustrative screen display 500F. According to some embodiments of the concepts and technologies described herein, the screen display 500F can be generated by a device such as the user device 102 via interactions with the orientation fingerprint service 112 and/or the orientation tracking application 108. In particular, according to various embodiments, the user device 102 can generate the screen display 500F and/or other screen displays in response to a user or other entity selecting the next step UI control 514 illustrated and described above with reference to FIG. 5E. Because the screen display 500F illustrated in FIG. 5F can be displayed at additional and/or alternative times, it should be understood that these examples are illustrative and therefore should not be construed as being limiting in any way.

The screen display 500F can include an updated version of the orientation fingerprint training program window 510. The orientation fingerprint training program window 510 can include a perform walking around UI control 528. The perform walking around UI control 528 can be selectable by a user or other entity to cause the user device 102 to present a simulated amount of walking around, during which the user device 102 can capture orientation information that can be used by the orientation tracking application 108 and/or the orientation fingerprint service 112 to create the orientation fingerprint 116. It can be appreciated that the orientation of the user device 102 when a user is walking around (e.g., around the home, around the public domain, and/or elsewhere) can relate not only to an angle at which the user holds the user device 102 (e.g., in his or her pocket, in a device holder, etc.), but also to movements of the device during walking such as the user's gait, the length and/or timing of the steps, and the like, which may vary widely among users of devices and therefore may be used to authenticate a user and/or activity on the user device 102.

According to some contemplated embodiments of the concepts and technologies disclosed herein, the simulated walking around can include instructions for the user to hold the user device 102 as usual (or to place the user device 102 in a holder or pocket, etc., as usual), and to walk around for a certain amount of time (e.g., one minute, two minutes, five minutes, or the like). In the illustrated embodiment shown in FIG. 5F, the user is instructed to walk around for a minute or two. It should be understood that this example is illustrative, and therefore should not be construed as being limiting in any way. Upon selecting the perform walking around UI control 528, the user device 102 can hide its screen or display a time to inform the user as to how much more walking time remains. An alarm (audible, visual, tactile, etc.) can be provided when the time is over, in some embodiments. It should be understood that this example is illustrative and therefore should not be construed as being limiting in any way.

As shown in FIG. 5F, the orientation fingerprint training program window 510 also includes the next step UI control 514, the selection of which can cause the user device 102 to go to a next step of the training program, in some embodiments. In some embodiments, the next step UI control 514 may not be selectable (e.g., may be grayed out and/or locked, etc.) until the perform walking around UI control 528 is selected and the user has walked around for the requisite time. As such, it should be understood that the illustrated example is illustrative and therefore should not be construed as being limiting in any way.

The orientation fingerprint training program window 510 also can include the cancel training UI control 516, which as noted before, can be selected to cause the user device 102 to stop the training of the orientation fingerprint 116, to pause the creation of the orientation fingerprint 116, and/or to perform other actions. Thus, selection of the cancel training UI control 516 can cause the user device 102 to hide the orientation fingerprint training program window 510, to exit the orientation tracking application 108, and/or to perform additional and/or alternative actions. Because additional or alternative controls can be included in the orientation fingerprint training program window 510, it should be understood that the example embodiment shown in FIG. 5F is illustrative and therefore should not be construed as being limiting in any way.

Figure 5G:
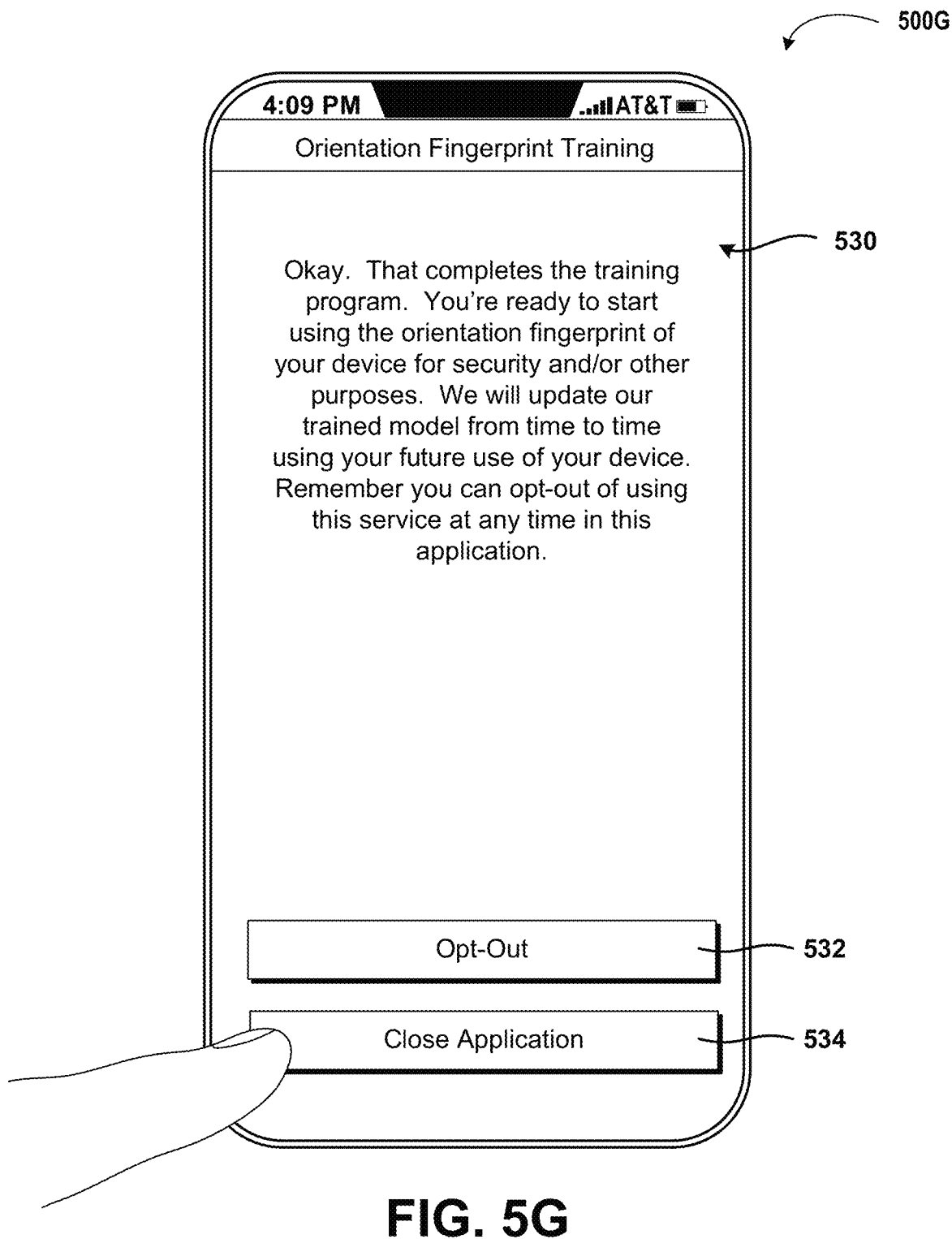

FIG. 5G shows an illustrative screen display 500G. According to some embodiments of the concepts and technologies described herein, the screen display 500G can be generated by a device such as the user device 102 via interactions with the orientation fingerprint service 112 and/or the orientation tracking application 108. In particular, according to various embodiments, the user device 102 can generate the screen display 500G and/or other screen displays in response to a user or other entity selecting the next step UI control 514 illustrated and described above with reference to FIG. 5F. Because the screen display 500G illustrated in FIG. 5G can be displayed at additional and/or alternative times, it should be understood that these examples are illustrative and therefore should not be construed as being limiting in any way.

The screen display 500G can include a training program complete message window 530. The training program complete message window 530 can include an indication that the training program (for the orientation fingerprint 116) has been completed, and can enable a user to opt-out of the orientation fingerprint use and/or to close the orientation tracking application 108. Namely, the training program complete message window 530 can include an opt-out UI control 532. Selection of the opt-out UI control 532 can cause the user device 102 to opt-out of using the orientation fingerprint 116 and/or to instruct the orientation fingerprint service 112 not to use the user's orientation fingerprint 116. It should be understood that the illustrated example is illustrative and therefore should not be construed as being limiting in any way.

The training program complete message window 530 also can include the close application UI control 534. The close application UI control 534 can be selected to cause the user device 102 to close the orientation tracking application 108 and/or to perform other actions. Thus, selection of the close application UI control 534 can cause the user device 102 to hide the training program complete message window 530, to exit the orientation tracking application 108, and/or to perform additional and/or alternative actions. Because additional or alternative controls can be included in the training program complete message window 530, it should be understood that the example embodiment shown in FIG. 5G is illustrative and therefore should not be construed as being limiting in any way. While the steps or portions of the training program have been illustrated in FIGS. 5A-5G as occurring in a particular order, it should be understood that this order is illustrative and should not be construed as being limiting in any way. The illustrated steps or portions of the training program and additional and/or alternative steps or operations of the training program can be presented in any order.

Figure 6:
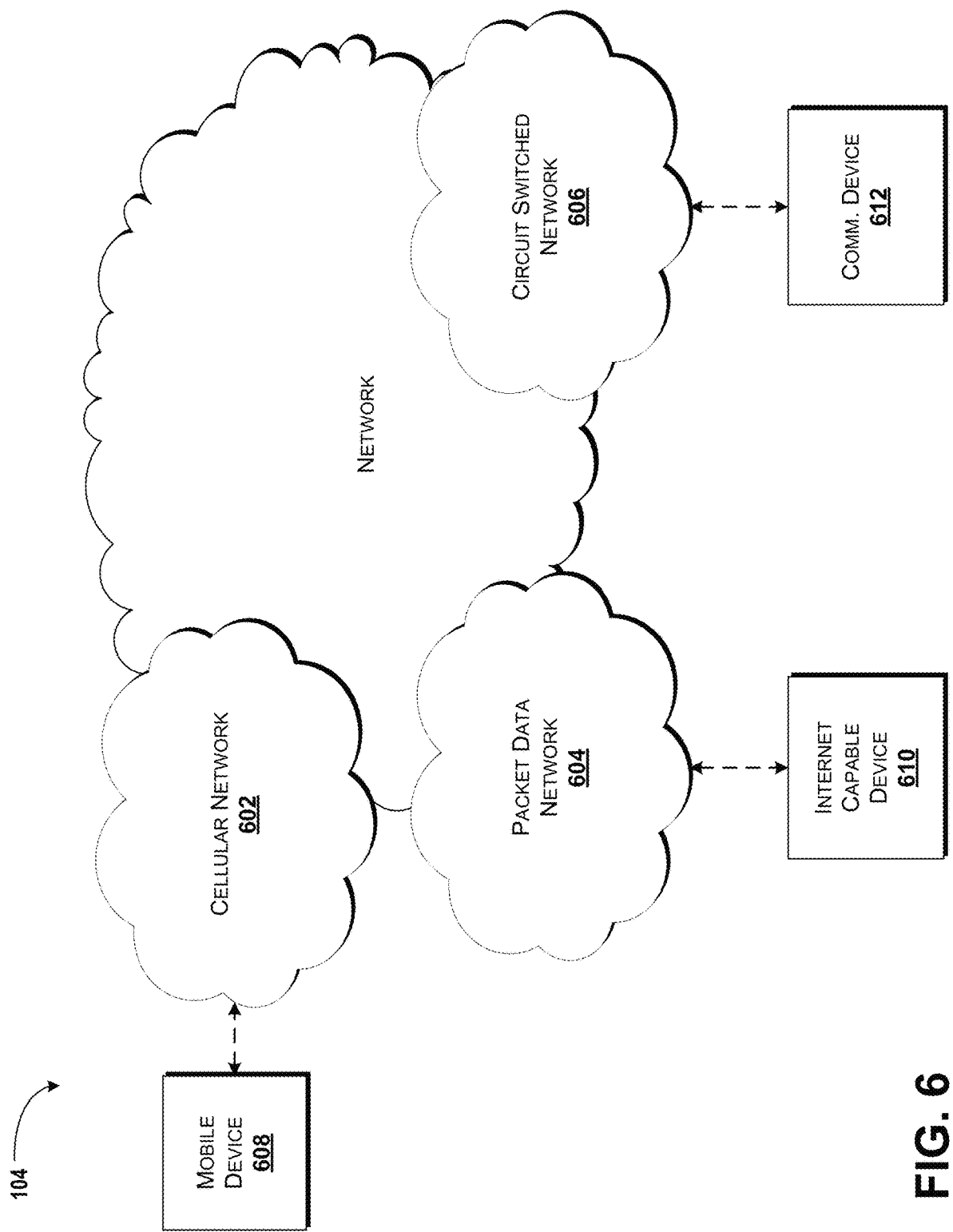
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
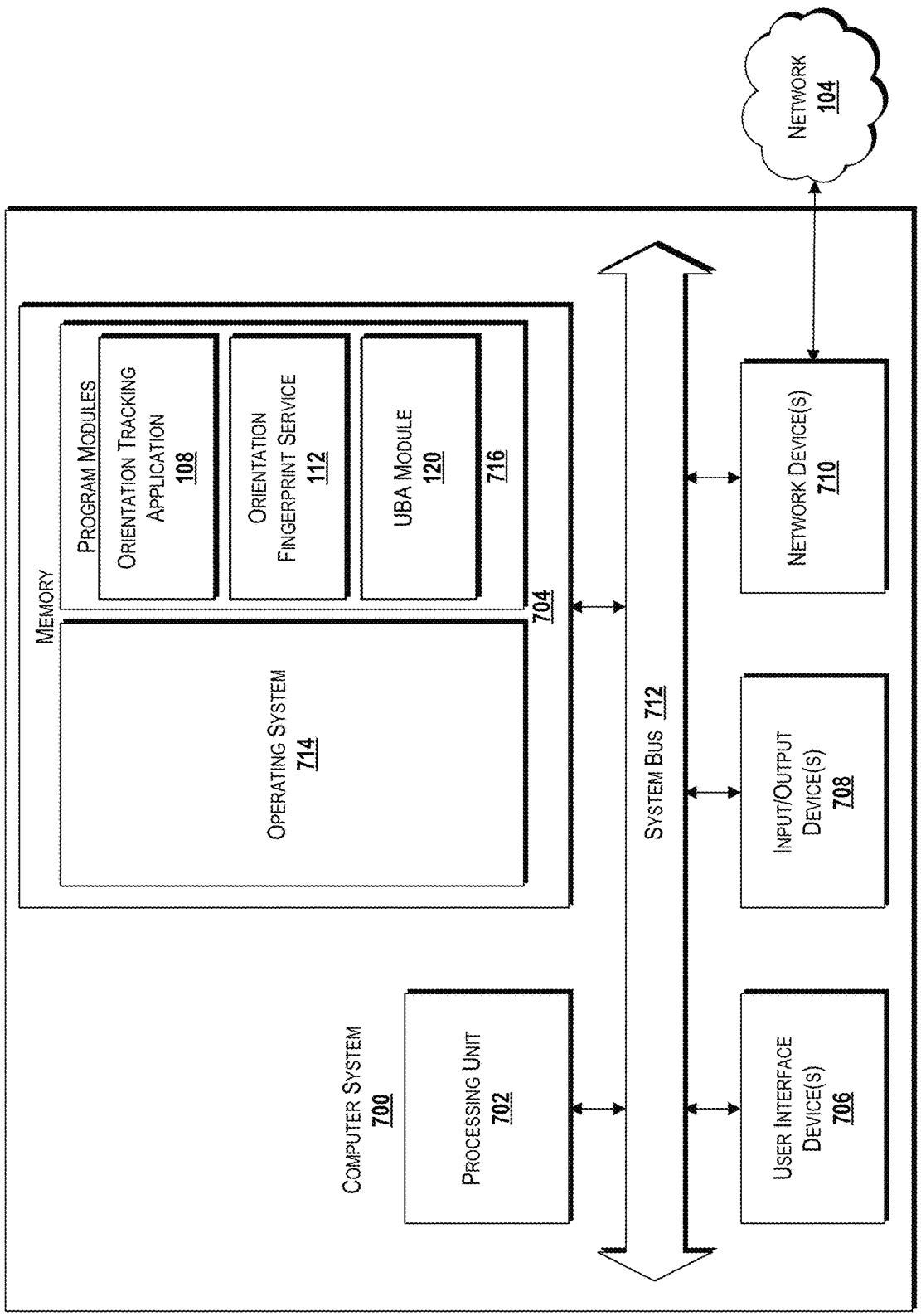
FIG. 7 is a block diagram illustrating an example computer system configured for use in creating and using device orientation fingerprints, according to some illustrative embodiments of the concepts and technologies described herein.

FIG. 7 is a block diagram illustrating a computer system 700 configured to provide the functionality described herein for creating and using device orientation fingerprints, in accordance with various embodiments of the concepts and technologies disclosed herein. According to various embodiments of the concepts and technologies disclosed herein, the user device 102, the server computer 114, the UBA module 120, and/or the resource 122 can have, or can be hosted by a device that has, an architecture similar or even identical to the illustrated computer system 700. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the orientation tracking application 108, the orientation fingerprint service 112, the UBA module 120, and/or other program modules. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the operational data 110, the orientation fingerprints 116, the commands 118, the identity verification requests 124, the identity verification decisions 126, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
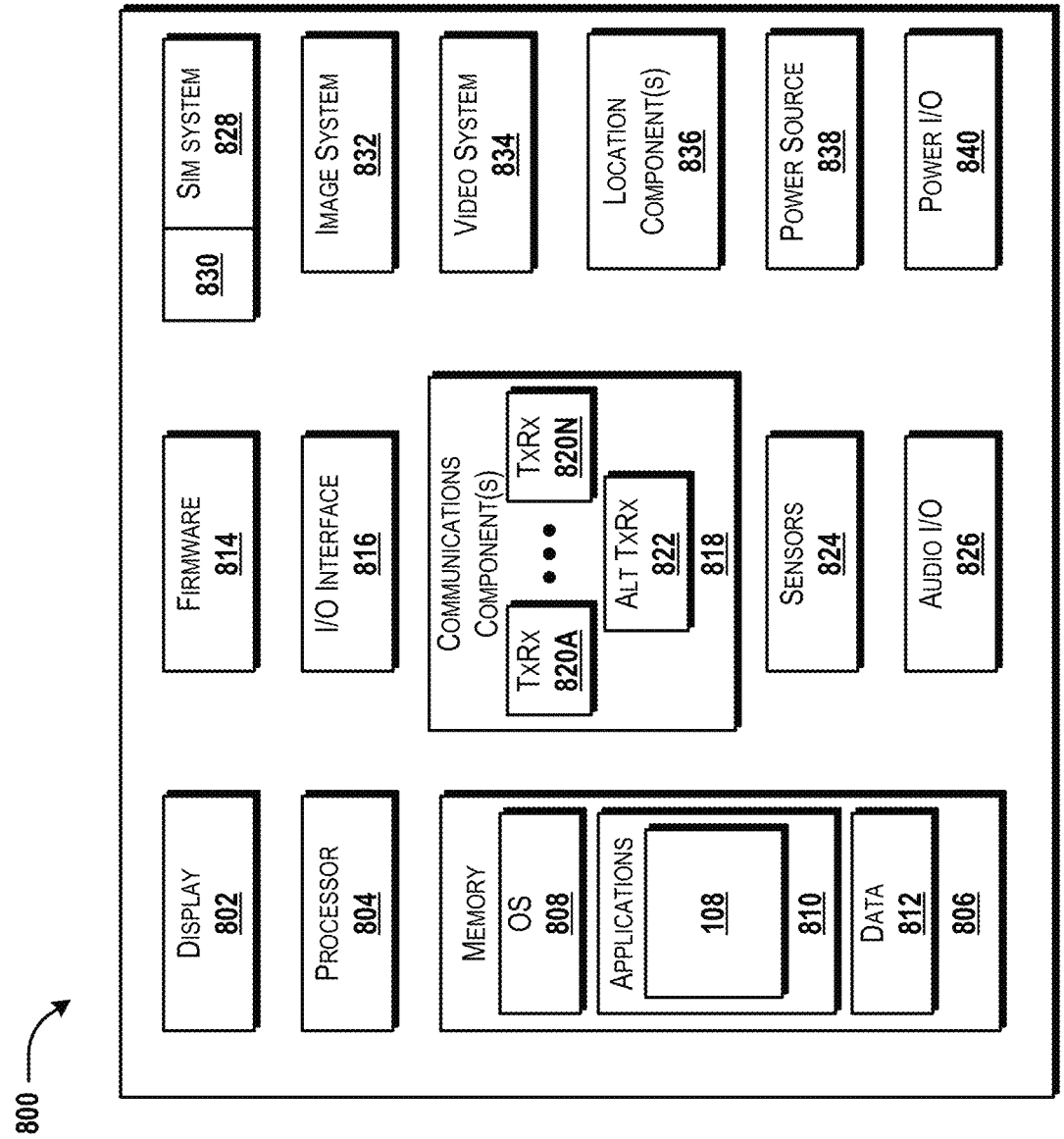
FIG. 8 is a block diagram illustrating an example mobile device configured for use in creating and using device orientation fingerprints, according to some illustrative embodiments of the concepts and technologies described herein.

Turning now to FIG. 8, an illustrative mobile device 800 and components thereof will be described. In some embodiments, the user device 102 described above with reference to FIGS. 1-5G can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, opt-in screens, training program screens, orientation service setting screens, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the orientation tracking application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, opting in or opting out to the orientation fingerprint service 112, configuring settings associated with the orientation tracking application 108 and/or the orientation fingerprint service 112, performing a training program for the orientation fingerprint service 112, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the operational data 110, the orientation fingerprints 116, the commands 118, the identity verification requests 124, the identity verification decisions 126, and/or applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
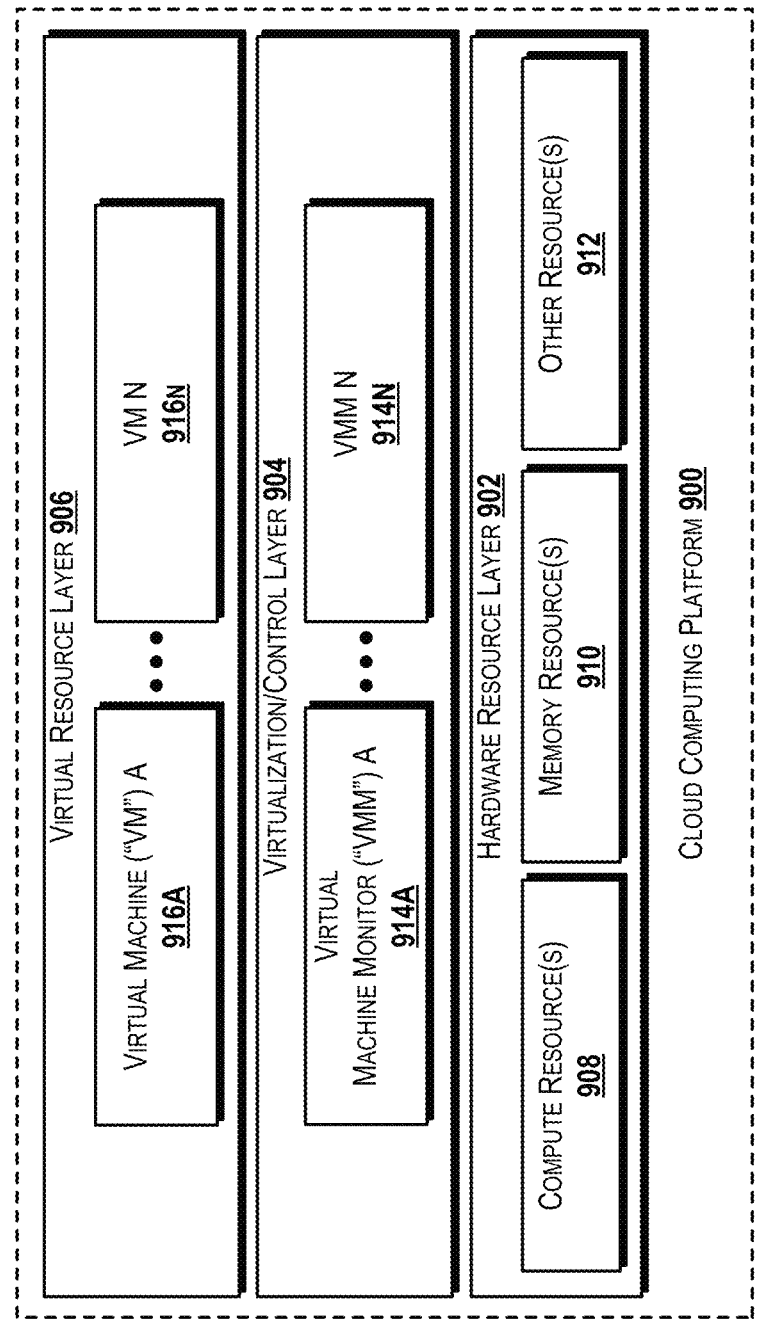
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for creating and using device orientation fingerprints and/or for interacting with the orientation fingerprint service 112. Thus, it can be appreciated that in some embodiments of the concepts and technologies disclosed herein, the cloud computing platform 900 illustrated in FIG. 9 can be used to provide the functionality described herein with respect to the user server computer 114, the UBA module 120, the resource 122, and/or other devices such as the data stores mentioned herein, network monitors mentioned herein, or the like.

The cloud computing platform 900 thus may be utilized to execute any aspects of the software components presented herein. Thus, according to various embodiments of the concepts and technologies disclosed herein, the orientation fingerprint service 112, the UBA module 120, or the resource 122, can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the applications and services illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that the an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the orientation fingerprint service 112, the UBA module 120, the resource 122, or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the operational data 110, the orientation fingerprints 116, the commands 118, the identity verification requests 124, the identity verification decisions 126, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for creating and using device orientation fingerprints have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:
   detecting a request to create an orientation fingerprint for a user device, wherein the orientation fingerprint comprises a machine learning model that models, for the user device and a known user of the user device, a plurality of orientations of the user device in three-dimensional spaces when the user device is used during a plurality of activities;
   obtaining, from the user device, operational data that comprises orientation data that defines orientation of the user device, identity data that identifies the known user of the user device, and activity data that defines the plurality of activities that are being engaged in using the user device, wherein the orientation data comprises a string of matrices that define three-dimensional orientations of the user device when used for respective activities of the plurality of activities;
   providing the operational data to machine learning to output the orientation fingerprint, wherein the orientation fingerprint models orientation of the user device and relates the plurality of orientations to the respective activities of the plurality of activities; and
   storing the orientation fingerprint with data that associates the orientation fingerprint with the known user.

2. The system of claim 1, wherein the orientation data comprise a first data point that defines a roll of the user device, a second data point that defines a pitch of the user device, and a third data point that defines a yaw of the user device.

3. The system of claim 2, wherein the orientation data is obtained from an orientation sensor of the user device, and wherein the orientation sensor comprises at least one of:
   a gyroscope; or
   a magnetometer.

4. The system of claim 1, wherein the computer-executable instructions, when executed by the processor, cause the processor to perform operations further comprising:
   determining that a current user of the user device is to be verified;
   obtaining the orientation fingerprint associated with the known user;
   obtaining, from the user device, another release of the operational data comprising current orientation data that defines a current orientation of the user device and a current activity being engaged in by the user device;
   providing the current activity to the orientation fingerprint as input;

obtaining, as output from the orientation fingerprint, an expected orientation of the user device when used for the current activity; and determining, based on the expected orientation and the current orientation, if the known user is currently using the user device, wherein the current user is verified as the known user if the expected orientation matches the current orientation.

5. The system of claim 4, wherein determining that the current user of the user device is to be verified comprises receiving, from a user behavioral analytics module, a service call requesting that the current user of the user device be verified.

6. The system of claim 5, wherein the user behavioral analytics module sends the service call in response to detecting an anomaly in behavior of the user device.

7. The system of claim 1, wherein the user device captures the operational data during a training program executed by the user device.

8. A method comprising:

detecting, by a computer comprising a processor, a request to create an orientation fingerprint for a user device, wherein the orientation fingerprint comprises a machine learning model that models, for the user device and a known user of the user device, a plurality of orientations of the user device in three-dimensional spaces when the user device is used during a plurality of activities;

obtaining, from the user device and by the processor, operational data that comprises orientation data that defines orientation of the user device, identity data that identifies the known user of the user device, and activity data that defines the plurality of activities that are being engaged in using the user device, wherein the orientation data comprises a string of matrices that define three-dimensional orientations of the user device when used for respective activities of the plurality of activities;

providing, by the processor, the operational data to machine learning to output the orientation fingerprint, wherein the orientation fingerprint models orientation of the user device and relates the plurality of orientations to the respective activities of the plurality of activities; and storing, by the processor, the orientation fingerprint with data that associates the orientation fingerprint with the known user.

9. The method of claim 8, wherein the orientation data is obtained from an orientation sensor of the user device, and wherein the orientation sensor comprises at least one of:

a gyroscope; or a magnetometer.

10. The method of claim 8, further comprising:

determining that a current user of the user device is to be verified;

obtaining the orientation fingerprint associated with the known user;

obtaining, from the user device, another release of the operational data comprising current orientation data that defines a current orientation of the user device and a current activity being engaged in by the user device;

providing the current activity to the orientation fingerprint as input;

obtaining, as output from the orientation fingerprint, an expected orientation of the user device when used for the current activity; and determining, based on the expected orientation and the current orientation, if the known user is currently using the user device, wherein the current user is verified as the known user if the expected orientation matches the current orientation.

11. The method of claim 10, wherein determining that the current user of the user device is to be verified comprises receiving, from a user behavioral analytics module, a service call requesting that the current user of the user device be verified.

12. The method of claim 11, wherein the user behavioral analytics module sends the service call in response to detecting an anomaly in behavior of the user device.

13. The method of claim 8, wherein the user device captures the operational data during a training program executed by the user device.

14. A computer storage medium having computer-executable instructions stored thereon that, when executed by a processor, cause the processor to perform operations comprising:

detecting a request to create an orientation fingerprint for a user device, wherein the orientation fingerprint comprises a machine learning model that models, for the user device and a known user of the user device, a plurality of orientations of the user device in three-dimensional spaces when the user device is used during a plurality of activities;

obtaining, from the user device, operational data that comprises orientation data that defines orientation of the user device, identity data that identifies the known user of the user device, and activity data that defines the plurality of activities that are being engaged in using the user device, wherein the orientation data comprises a string of matrices that define three-dimensional orientations of the user device when used for respective activities of the plurality of activities;

providing the operational data to machine learning to output the orientation fingerprint wherein the orientation fingerprint models orientation of the user device and relates the plurality of orientations to the respective activities of the plurality of activities; and storing the orientation fingerprint with data that associates the orientation fingerprint with the known user.

15. The computer storage medium of claim 14, wherein the orientation data comprise a first data point that defines a roll of the user device, a second data point that defines a pitch of the user device, and a third data point that defines a yaw of the user device.

16. The computer storage medium of claim 15, wherein the orientation data is obtained from an orientation sensor of the user device, and wherein the orientation sensor comprises at least one of:

a gyroscope; or a magnetometer.

17. The computer storage medium of claim 14, wherein the computer-executable instructions, when executed by the processor, cause the processor to perform operations further comprising:

determining that a current user of the user device is to be verified;

obtaining the orientation fingerprint associated with the known user;

obtaining, from the user device, another release of the operational data comprising current orientation data that defines a current orientation of the user device and a current activity being engaged in by the user device;

providing the current activity to the orientation fingerprint as input;

obtaining, as output from the orientation fingerprint, an expected orientation of the user device when used for the current activity; and determining, based on the expected orientation and the current orientation, if the known user is currently using the user device, wherein the current user is verified as the known user if the expected orientation matches the current orientation.

18. The computer storage medium of claim 17, wherein determining that the current user of the user device is to be verified comprises receiving, from a user behavioral analytics module, a service call requesting that the current user of the user device be verified.

19. The computer storage medium of claim 18, wherein the user behavioral analytics module sends the service call in response to detecting an anomaly in behavior of the user device.

20. The computer storage medium of claim 14, wherein the user device captures the operational data during a training program executed by the user device.

\* \* \* \* \*